US008982792B2

(12) United States Patent
Liu et al.

(10) Patent No.: US 8,982,792 B2
(45) Date of Patent: Mar. 17, 2015

(54) LONG RANGE WLAN DATA UNIT FORMAT

(75) Inventors: Yong Liu, Campbell, CA (US); Harish Ramamurthy, Cupertino, CA (US); Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 27 days.

(21) Appl. No.: 13/586,704

(22) Filed: Aug. 15, 2012

(65) Prior Publication Data

US 2013/0044688 A1 Feb. 21, 2013

Related U.S. Application Data

(60) Provisional application No. 61/523,771, filed on Aug. 15, 2011, provisional application No. 61/528,649, filed on Aug. 29, 2011, provisional application No. 61/533,065, filed on Sep. 9, 2011, provisional application No. 61/548,965, filed on Oct. 19, 2011, provisional application No. 61/561,754, filed on Nov. 18, 2011, provisional application No. 61/565,330, filed on Nov. 30, 2011, provisional application No. 61/565,904, filed on Dec. 1, 2011, provisional application No. 61/585,570, filed on Jan. 11, 2012, provisional application No. 61/592,257, filed on Jan. 30, 2012, provisional application No. 61/595,343, filed on Feb. 6, 2012.

(51) Int. Cl.
| | |
|---|---|
| H04W 74/04 | (2009.01) |
| H04W 72/12 | (2009.01) |
| H04W 28/26 | (2009.01) |
| H04W 84/12 | (2009.01) |
| H04W 28/06 | (2009.01) |
| H04L 5/00 | (2006.01) |
| H04L 27/00 | (2006.01) |
| H04W 8/26 | (2009.01) |

(52) U.S. Cl.
CPC ............ H04W 28/06 (2013.01); H04L 5/0053 (2013.01); H04L 5/0091 (2013.01); H04L 27/0006 (2013.01); H04W 8/26 (2013.01); H04W 84/12 (2013.01)
USPC ........................... 370/328; 370/474; 714/748

(58) Field of Classification Search
USPC ......... 370/328, 389, 390, 461, 463, 474, 476, 370/477; 714/748
See application file for complete search history.

(56) References Cited

U.S. PATENT DOCUMENTS

| | | | |
|---|---|---|---|
| 5,617,421 | A | 4/1997 | Chin et al. |
| 5,796,727 | A | 8/1998 | Harrison et al. |

(Continued)

FOREIGN PATENT DOCUMENTS

WO   WO-2012/122119 A1   9/2012

OTHER PUBLICATIONS

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

(Continued)

*Primary Examiner* — Ahmed Elallam

(57) ABSTRACT

In a method for generating a data unit for transmission in a wireless network, a physical layer (PHY) preamble is generated. A field to indicate whether an acknowledgment data unit is intended to follow the data unit is generated and included in the PHY preamble. A media access control layer (MAC) header is generated, and the data unit is generated to include the PHY preamble and the MAC header. The data unit is transmitted.

18 Claims, 31 Drawing Sheets

(56) References Cited

U.S. PATENT DOCUMENTS

| | | | |
|---|---|---|---|
| 7,073,079 B1 | 7/2006 | Karsi et al. | |
| 7,415,624 B2 | 8/2008 | Miller et al. | |
| 7,489,708 B2 * | 2/2009 | Kim | 370/470 |
| 7,697,561 B2 * | 4/2010 | Nishibayashi et al. | 370/445 |
| 7,839,845 B2 | 11/2010 | Stephens | |
| 7,876,897 B2 | 1/2011 | Yi | |
| 7,987,363 B2 | 7/2011 | Chauncey et al. | |
| 8,144,647 B2 | 3/2012 | Nabar et al. | |
| 8,711,742 B2 * | 4/2014 | Sugaya | 370/310 |
| 2004/0215750 A1 | 10/2004 | Stilp | |
| 2004/0218683 A1 * | 11/2004 | Batra et al. | 375/261 |
| 2005/0028072 A1 | 2/2005 | Murthy | |
| 2006/0050709 A1 * | 3/2006 | Sung et al. | 370/394 |
| 2006/0057968 A1 * | 3/2006 | Ohtani | 455/67.16 |
| 2006/0268886 A1 * | 11/2006 | Sammour et al. | 370/394 |
| 2007/0171933 A1 * | 7/2007 | Sammour et al. | 370/447 |
| 2007/0263570 A1 * | 11/2007 | Alapuranen et al. | 370/337 |
| 2007/0280258 A1 | 12/2007 | Rajagopalan et al. | |
| 2008/0232287 A1 | 9/2008 | Shao et al. | |
| 2009/0092039 A1 | 4/2009 | Niu et al. | |
| 2009/0189777 A1 | 7/2009 | Johnson et al. | |
| 2009/0196163 A1 | 8/2009 | Du | |
| 2009/0279488 A1 | 11/2009 | Zheng et al. | |
| 2010/0220639 A1 | 9/2010 | Sugaya | |
| 2010/0303096 A1 | 12/2010 | Kasher et al. | |
| 2011/0069688 A1 | 3/2011 | Zhang et al. | |
| 2011/0085459 A1 | 4/2011 | Kuriki | |
| 2011/0222487 A1 | 9/2011 | Sekiya et al. | |
| 2012/0113903 A1 * | 5/2012 | Kneckt et al. | 370/329 |
| 2012/0163292 A1 * | 6/2012 | Kneckt et al. | 370/328 |
| 2012/0195391 A1 | 8/2012 | Zhang et al. | |
| 2012/0201316 A1 | 8/2012 | Zhang et al. | |
| 2012/0294294 A1 | 11/2012 | Zhang | |
| 2012/0300874 A1 | 11/2012 | Zhang | |
| 2013/0044607 A1 | 2/2013 | Liu et al. | |
| 2013/0044687 A1 | 2/2013 | Liu et al. | |
| 2013/0044877 A1 | 2/2013 | Liu et al. | |

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-259 (1999).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, pp. 1-91 (1999).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123, Nov. 2011.

Park, "Proposed Specification Framework for TGah", *The Institute of Electrical and Electronics Engineers*, doc. No. IEEE 802.11-11/1137r6, pp. 1-13 (Mar. 2012).

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless Lan Medium Access Control (MAC) and Physical Layer (PHY) specifications: Further Higher Data Rate Extension in the 2.4 GHz Band, "*The Institute of Electrical and Electronics Engineers, Inc.*, pp. 1-69, Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648, (2007).

"IEEE P802.11n™ /D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544, Sep. 2007.

"IEEE Std. 802.11 n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 Oct. 2009.

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359, Jan. 2012.

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363, Mar. 2012.

S. A. Mujtaba, "IEEE P802.11—Wireless LANs, TGn Sync Proposal Technical Specification," *The Institute of Electrical and Electronics Engineers, Inc.*, doc.: IEEE 802.11 04/0889r6, pp. 1-131, May 2005.

Partial International Search report for International Application No. PCT/US2012/050975, pp. 1-4, dated Jan. 4, 2013.

Draft P802.15.3/D0.2 "Information technology—Telecommunications and information exchange between systems Local and metropolitan area networks—Specific requirements—Part 15.3: High Rate Wireless Personal Area Networks Medium Access Control (MAC) and Physical Layer (PHY) Specifications for High Rate Wireless Personal Area Networks (WPANs)," *The Institute of Electrical and Electronics Engineers, Inc.* pp. 1-134 (2001).

IEEE Std 802.15.4™-2011 (Revision of IEEE Std 802.15.4-2006) "IEEE Standard for Local and metropolitan area networks Part 15.4: Low-Rate Wireless Personal Area Networks (LR-WPANs)," The Institute of Electrical and Electronics Engineers, Inc. pp. 1-314 (Sep. 5, 2011).

International Search Report for International Application No. PCT/US2012/050975, pp. 1-15, dated Mar. 7, 2013.

Written Opinion for International Application No. PCT/US2012/050975, pp. 1-10, dated Mar. 7, 2013.

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, Institute for Electrical and Electronics Engineers, pp. 1-49, Jan. 18, 2011.

Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.

(56) References Cited

OTHER PUBLICATIONS

Yu, et al. "Coverage extension for IEEE802.11ah," *The Institute of Electrical and Electronics Engineers*, doc. No. IEEE 802.11-11/0035r1, pp. 1-10 (Jan. 2011).
Taghavi et al., "Introductory Submission for TGah", doc. No. IEEE 802.11-11/0062r0, *Institute for Electrical and Electronics Engineers*, pp. 1-5 (Jan. 14, 2011).
de Vegt, "Potential Compromise for 802.11ah Use Case Document", Institute of Electrical and Electronics Engineers, doc. No. IEEE 802.11-11/0457r0, pp. 1-27, (Mar. 2011).
Zhang et al., "11ah Data Transmission Flow," *The Institute of Electrical and Electronics Engineers*, doc. No. IEEE 802.11-11/1484r1, pp. 1-15 (Nov. 2011).
Park, "Proposed Specification Framework for TGah D9.x", *The Institute of Electrical and Electronics Engineers*, doc. No. IEEE 802.11-yy/xxxxr0, pp. 1-30 (Jul. 2012).
Vermani, et al. "Preamble Format for 1 MHz," *The Institute of Electrical and Electronics Engineers*, doc. No. IEEE 802.11-11/1482r2, pp. 1-30 (Nov. 2011).
Zhang et al., "1MHz Waveform in Wider BW ", *The Institute of Electrical and Electronics Engineers*, doc. No. IEEE 802.11-12/0309r1, pp. 1-10 (Mar. 2012).
Vermani, et al. "Spec Framework Text for PHY Numerology," *The Institute of Electrical and Electronics Engineers*, doc. No. IEEE 802.11-11/1311r0, pp. 1-5 (Sep. 2011).
Lee et al., "TGaf PHY proposal," *The Institute of Electrical and Electronics Engineers*, doc. No. IEEE 802.11-12/0809r5, pp. 1-43, Jul. 10, 2012.
Park, "Proposed Specification Framework for TGah", *The Institute of Electrical and Electronics Engineers*, doc. No. IEEE 802.11-11/1137r11, pp. 1-36 (Sep. 2012).
Park, "Specification Framework for TGah," *The Institute of Electrical and Electronics Engineers*, doc. No. IEEE 802.11-11/1137r13, pp. 1-58 (Jan. 14, 2013).
Shao, "Channel Selection for 802.11ah," doc.: IEEE 802.11-12/0816r0, pp. 1-11 (Jul. 2012).
Zhang et al., "Beamforming Feedback for Single Stream," *The Institute of Electrical and Electronics Engineers*, doc. No. IEEE 802.11-12/1312r0, pp. 1-22 (Nov. 12, 2012).
International Preliminary Report on Patentability in related International Application No. PCT/US2012/050975 dated Feb. 27, 2014 (11 pages).
Office Action in related U.S. Appl. No. 13/586,678, dated Feb. 10, 2014 (14 pages).
Office Action in related U.S. Appl. No. 13/586,678, dated Jul. 24, 2014 (17 pages).
Office Action in related U.S. Appl. No. 13/586,690, dated Dec. 30, 2013 (13 pages).
Notice of Allowance in related U.S. Appl. No. 13/586,690, dated Aug. 8, 2014 (7 pages).
Notice of Allowance in U.S. Appl. No. 13/586,690, mailed Nov. 26, 2014 (9 pages).
Office Action in U.S. Appl. No. 13/586,698, mailed Dec. 18, 2014 (19 pages).
Notice of Allowance in U.S. Appl. No. 13/586,678, mailed Jan. 14, 2015 (11 pages).

\* cited by examiner

| | Data rate (Mbps) | MPDU Data (bytes) | PPDU duration (us) | Single TXOP (us) | Through-put (Mbps) | Effi-ciency | Back-off | Pre-amble | MAC header | SIFS | ACK |
|---|---|---|---|---|---|---|---|---|---|---|---|
| VLR | 0.1875 | 100 | 5056 | 8079.5 | 9.90% | 52.81% | 17.22% | 9.51% | 16.90% | 1.58% | 18.62% |
| | 0.1875 | 200 | 9312 | 12335.5 | 12.97% | 69.18% | 11.28% | 6.23% | 11.07% | 1.04% | 12.19% |
| | 0.1875 | 300 | 13568 | 16591.5 | 14.47% | 77.15% | 8.39% | 4.63% | 8.23% | 0.77% | 9.06% |
| NR | 0.75 | 100 | 1280 | 2271.5 | 35.22% | 46.96% | 21.11% | 8.45% | 15.03% | 5.64% | 16.91% |
| | 0.75 | 200 | 2336 | 3327.5 | 48.08% | 64.11% | 14.41% | 5.77% | 10.26% | 3.85% | 11.54% |
| | 0.75 | 300 | 3392 | 4383.5 | 54.75% | 73.00% | 10.94% | 4.38% | 7.79% | 2.92% | 8.76% |

302 →   304 →

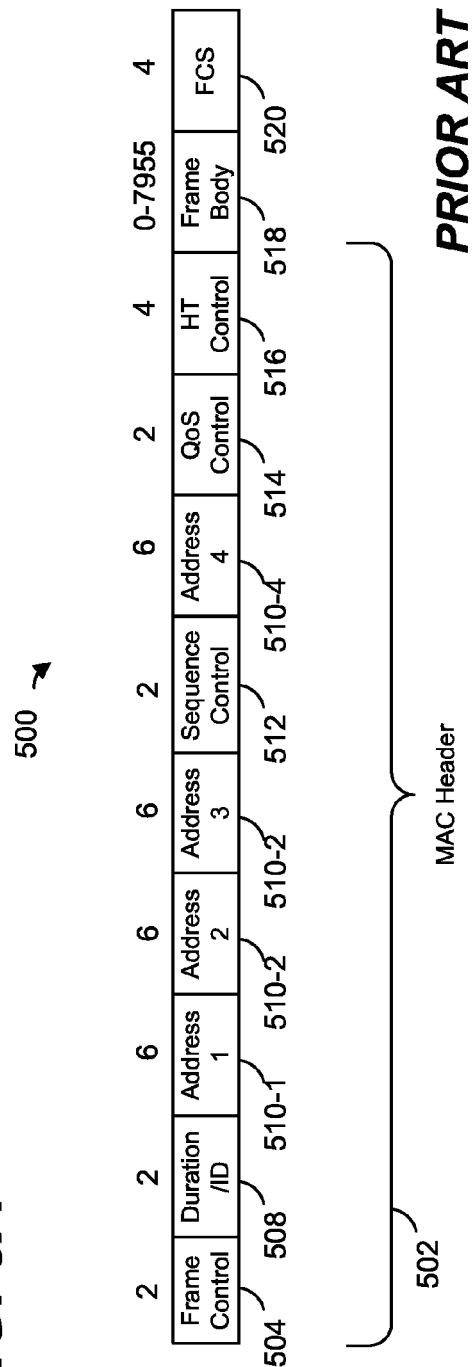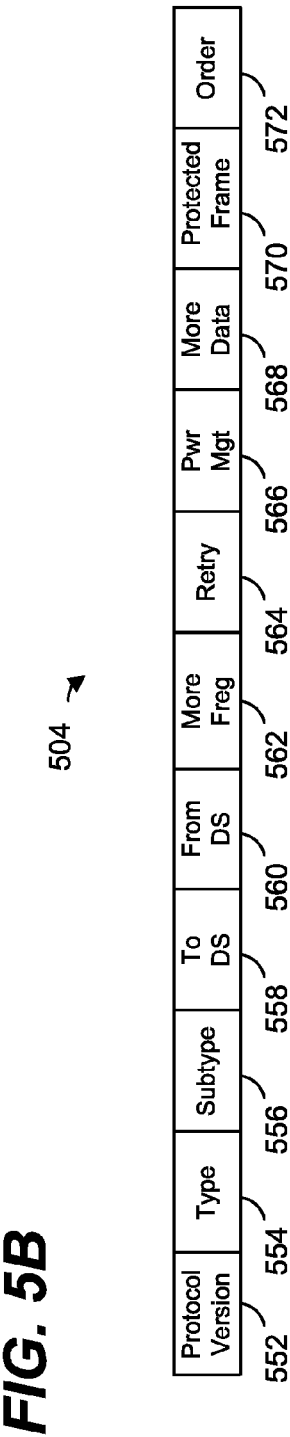

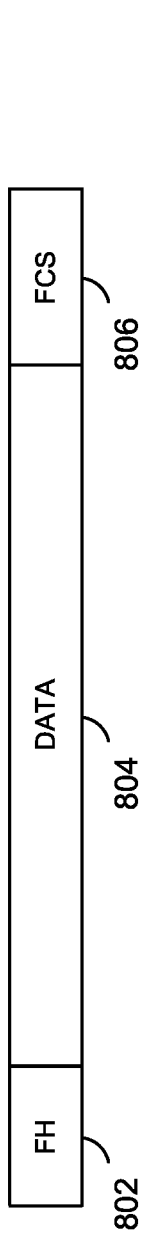
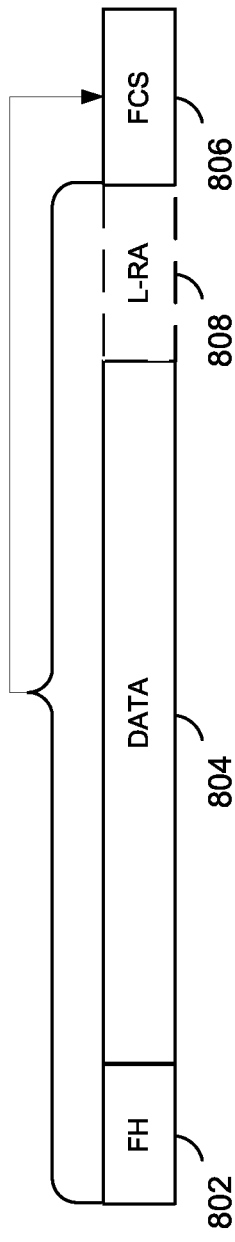
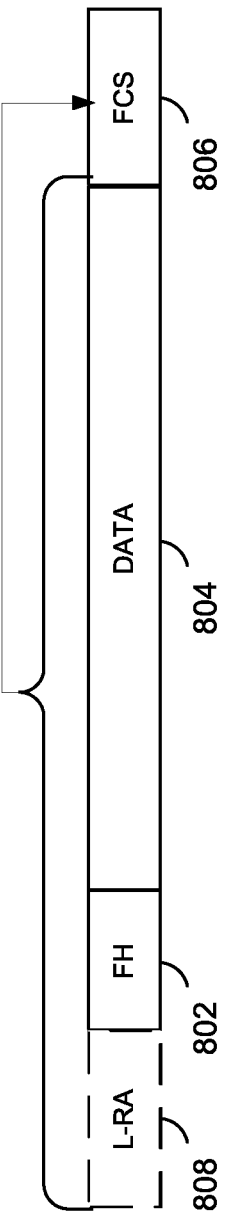
FIG. 8A
FIG. 8B
FIG. 8C

| TYPE | ID | MD | Duration | BW | CRC | Tail |

1702　1704　1706　1708　1710　1712　1714

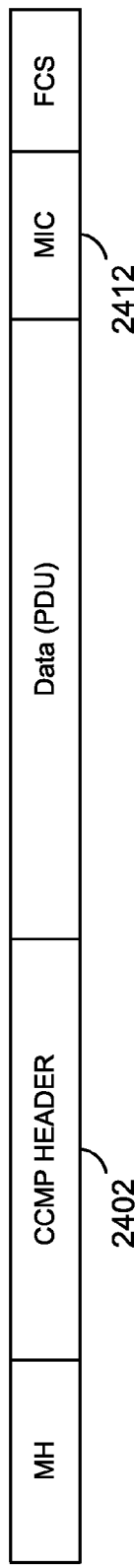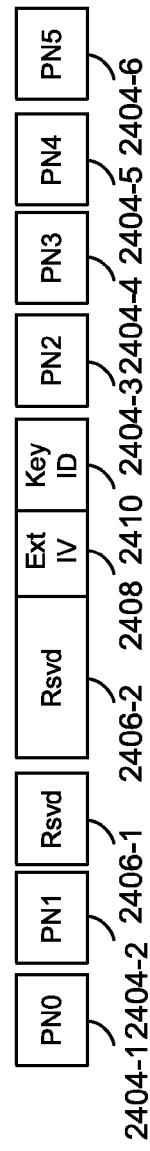
FIG. 24
PRIOR ART

LONG RANGE WLAN DATA UNIT FORMAT

CROSS-REFERENCE TO RELATED APPLICATION

This disclosure claims the benefit of the following U.S. Provisional Patent Applications:

U.S. Provisional Patent Application No. 61/523,771, entitled "802.11ah Frame Format Design," filed on Aug. 15, 2011;

U.S. Provisional Patent Application No. 61/528,649, entitled "802.11ah Frame Format Design," filed on Aug. 29, 2011;

U.S. Provisional Patent Application No. 61/533,065, entitled "802.11ah Frame Format Design," filed on Sep. 9, 2011;

U.S. Provisional Patent Application No. 61/548,965, entitled "802.11ah Frame Format Design," filed on Oct. 19, 2011;

U.S. Provisional Patent Application No. 61/561,754, entitled "802.11ah Frame Format Design," filed on Nov. 18, 2011;

U.S. Provisional Patent Application No. 61/565,330, entitled "802.11ah Frame Format Design," filed on Nov. 30, 2011;

U.S. Provisional Patent Application No. 61/565,904, entitled "802.11ah Frame Format Design," filed on Dec. 1, 2011;

U.S. Provisional Patent Application No. 61/585,570, entitled "802.11ah Frame Format Design," filed on Jan. 11, 2012;

U.S. Provisional Patent Application No. 61/592,257, entitled "802.11ah Frame Format Design," filed on Jan. 30, 2012;

U.S. Provisional Patent Application No. 61/595,343 entitled "802.11ah Frame Format Design," filed on Feb. 6, 2012.

The disclosures of all of the above-referenced patent applications are hereby incorporated by reference herein in their entireties.

The present application is related to U.S. patent application Ser. No. 13/586,678, entitled "Long Range WLAN Data Unit Format," filed on the same day as the present application, and hereby incorporated by reference herein in its entirety.

The present application is related to U.S. patent application Ser. No. 13/586,690, entitled "Long Range WLAN Data Unit Format," filed on the same day as the present application, and hereby incorporated by reference herein in its entirety.

The present application is related to U.S. patent application Ser. No. 13/586,698, entitled "Long Range WLAN Data Unit Format," filed on the same day as the present application, and hereby incorporated by reference herein in its entirety.

FIELD OF THE DISCLOSURE

The present disclosure relates generally to communication networks and, more particularly, to data unit formats for long range wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the Gbps range.

Work has begun on two new standards, IEEE 802.11ah and IEEE 802.11af, each of which will specify wireless network operation in sub-1 GHz frequencies. Low frequency communication channels are generally characterized by better propagation qualities and extended propagation ranges compared to higher frequency communication channels. In the past, sub-1 GHz frequency ranges have not been utilized for wireless communication networks because such frequencies were reserved for other applications (e.g., licensed TV frequency bands, radio frequency band, etc.). There are few frequency bands in the sub-1 GHz range that remain unlicensed, with different unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In one embodiment, a method for generating a data unit for transmission in a wireless network includes generating a physical layer (PHY) preamble. Generating the PHY preamble includes generating a field to indicate whether an acknowledgment data unit is intended to follow the data unit, and including the field in the PHY preamble. The method also includes generating a media access control layer (MAC) header, and generating the data unit to include the PHY preamble and the MAC header. The method further includes causing the data unit to be transmitted.

In other embodiments, the method includes any combination of one or more of the following elements.

The field also indicates, when the acknowledgment data unit is intended to follow the data unit, whether the acknowledgment data unit is a block acknowledgment.

The field consists of two bits, and a first value of the field indicates the acknowledgment data unit is intended to follow the data unit, a second value of the field indicates a block acknowledgment data unit is intended to follow the data unit, and a third value of the field indicates that no acknowledgment data unit is intended to follow the data unit.

The data unit is a first data unit, the field to indicate whether an acknowledgment data unit is intended to follow the first data unit is a first field, and the method further comprises generating a second field to indicate whether a second data unit is to be transmitted after the acknowledgment data unit, including the second field in the PHY preamble of the first data unit, generating the second data unit, and causing the second data unit to be transmitted after receiving the acknowledgement data unit.

In another embodiment, an apparatus comprises a network interface configured to generate a physical layer (PHY) preamble at least by generating a field to indicate whether an acknowledgment data unit is intended to follow the data unit, and including the field in the PHY preamble. The network interface is also configured to generate a media access control layer (MAC) header, and generate the data unit to include the PHY preamble and the MAC header. The network interface is further configured to transmit the data unit.

In other embodiments, the apparatus includes any combination of one or more of the following features.

The field also indicates, when the acknowledgment data unit is intended to follow the data unit, whether the acknowledgment data unit is a block acknowledgment.

The field consists of two bits, and a first value of the field indicates the acknowledgment data unit is intended to follow the data unit, a second value of the field indicates a block acknowledgment data unit is intended to follow the data unit, and a third value of the field indicates that no acknowledgment data unit is intended to follow the data unit.

The data unit is a first data unit, the field to indicate whether an acknowledgment data unit is intended to follow the first data unit is a first field, and the network interface is configured to generate a second field to indicate whether a second data unit is to be transmitted after the acknowledgment data unit, including the second field in the PHY preamble of the first data unit, generate the second data unit, and, after receiving the acknowledgement data unit, transmit the second data unit.

In yet another embodiment, a method for sharing access to a communication medium in a wireless network includes receiving, at a first communication device, a data unit transmitted by a second communication device. The method also includes processing, at the first communication device, a field in a physical layer (PHY) preamble of the data unit to determine whether an acknowledgement data unit is intended to follow the data unit, wherein the field in the PHY preamble indicates whether an acknowledgement data unit is intended to follow the data unit, and wherein the acknowledgment data unit is to be transmitted by a third communication device. The method additionally includes determining, at the first communication device, a time period during which the first communication device is to refrain from transmitting, wherein the time period corresponds to (i) a time to transmit the data unit and, (ii) when it is determined that an acknowledgement data unit is intended to follow the data unit, a time to transmit the acknowledgment data unit. The method further includes refraining, at the first communication device, from transmitting during the determined time period.

In other embodiments, the method includes any combination of one or more of the following elements.

The field also indicates, when the acknowledgment data unit is intended to follow the data unit, whether the acknowledgment data unit is a block acknowledgment.

The field consists of two bits, and a first value of the field indicates the acknowledgment data unit is intended to follow the data unit, a second value of the field indicates a block acknowledgment data unit is intended to follow the data unit, and a third value of the field indicates that no acknowledgment data unit is intended to follow the data unit.

The data unit is a first data unit, the field to indicate whether an acknowledgment data unit is intended to follow the first data unit is a first field, and the method further includes processing, at the first communication device, a second field in the PHY preamble of the first data unit to determine whether a second data unit is to be transmitted by the second communication device after the acknowledgement data unit, wherein the time period also corresponds to, (iii) when it is determined that the second data unit is to be transmitted by the second communication device after the acknowledgement data unit, a time to transmit the second data unit.

The data unit is a first data unit, the field to indicate whether an acknowledgment data unit is intended to follow the first data unit is a first field, and the method further includes receiving, at the first communication device, the acknowledgment data unit transmitted by the third communication device, processing, at the first communication device, a second field in the acknowledgment data unit to determine whether a second data unit is to be transmitted by the second communication device after the acknowledgement data unit, wherein the second field in the acknowledgment data unit indicates whether the second data unit is to be transmitted by the second communication device after the acknowledgement data unit, wherein the time period also corresponds to, (iii) when it is determined that the second data unit is to be transmitted by the second communication device after the acknowledgement data unit, a time to transmit the second data unit.

In still another embodiment, a first communication device comprises a network interface configured to receive a data unit transmitted by a second communication device and process a field in a physical layer (PHY) preamble of the data unit to determine whether an acknowledgement data unit is intended to follow the data unit, wherein the field in the PHY preamble indicates whether an acknowledgement data unit is intended to follow the data unit, and wherein the acknowledgment data unit is to be transmitted by a third communication device. The network interface is also configured to determine a time period during which the first device is to refrain from transmitting, wherein the time period corresponds to (i) a time to transmit the data unit and, (ii) when it is determined that an acknowledgement data unit is intended to follow the data unit, a time to transmit the acknowledgment data unit, and refrain from transmitting during the determined time period.

In other embodiments, the first communication device includes any combination of one or more of the following features.

The field also indicates, when the acknowledgment data unit is intended to follow the data unit, whether the acknowledgment data unit is a block acknowledgment.

The field consists of two bits, and a first value of the field indicates the acknowledgment data unit is intended to follow the data unit, a second value of the field indicates a block acknowledgment data unit is intended to follow the data unit, and a third value of the field indicates that no acknowledgment data unit is intended to follow the data unit.

The data unit is a first data unit, the field to indicate whether an acknowledgment data unit is intended to follow the first data unit is a first field, and the network interface is configured to process a second field in the PHY preamble of the first data unit to determine whether a second data unit is to be transmitted by the second communication device after the acknowledgement data unit, wherein the time period also corresponds to, (iii) when it is determined that the second data unit is to be transmitted by the second communication device after the acknowledgement data unit, a time to transmit the second data unit.

The data unit is a first data unit, the field to indicate whether an acknowledgment data unit is intended to follow the first data unit is a first field, and the network interface is configured to receive the acknowledgment data unit transmitted by the third communication device, process a second field in the acknowledgment data unit to determine whether a second data unit is to be transmitted by the second communication device after the acknowledgement data unit, wherein the second field in the acknowledgment data unit indicates whether the second data unit is to be transmitted by the second communication device after the acknowledgement data unit, wherein the time period also corresponds to, (iii) when it is determined that the second data unit is to be transmitted by the second communication device after the acknowledgement data unit, a time to transmit the second data unit.

BRIEF DESCRIPTION OF THE DRAWINGS

FIG. 3 is a table illustrating transmission efficiency analysis for data unit transmission using frame formats defined by the current IEEE 802.11 Standard.

FIG. 5A is a diagram of a prior art medium access control (MAC) layer frame.

FIG. 5B is a diagram of a prior art frame control field included in the MAC layer frame of FIG. 5A.

FIGS. 8A-8C are diagrams illustrating frame check sequence (FCS) calculation at a transmitting device, according to some such embodiments.

FIG. 17 is a diagram of a signal field of a control data unit, according to another embodiment.

FIG. 24 is a diagram of a prior art data unit that includes a cryptography information header.

DETAILED DESCRIPTION

In embodiments described below, a wireless network device such as an access point (AP) of a wireless local area network (WLAN) transmits data streams to one or more client stations. The AP is configured to operate with client stations according to at least a communication protocol. In an embodiment, the communication protocol defines operation in a sub 1 GHz frequency range, and is typically used for applications requiring long range wireless communication with relatively low data rates (e.g., as compared to the communication protocol defined by the IEEE 802.11n Standard). The communication protocol (e.g., as defined by the IEEE 802.11af Standard or the IEEE 802.11ah Standard, currently in development, in some embodiments) is referred to herein as a "long range" communication protocol.

In an embodiment, the long range communication protocol defines two or more communication modes including at least a normal rate (NR) mode and a very low rate (VLR) mode. The VLR mode has lower data rates than the NR mode and is intended for communication at even longer ranges as compared with the NR mode.

In some embodiments, the long range communication protocol defines medium access control (MAC) layer and physical (PHY) layer data unit format that is similar to data unit format defined by the current 802.11 Standard. However, due to lower data rates generally defined by the long range communication protocol, overhead associated with transmission of data units that are not used for transmission of data, such as management or control data units, as well as overhead associated with transmission of non-data portions of data unit that carry actual data is greater in long range transmission relative to the higher data rate transmission associated with current IEEE 802-11 protocols. Further, lower data rates and longer transmission times result in higher power consumption by devices operating according to the long range protocol relative to power consumption associated with devices operating according to current IEEE 802.11 protocols in at least some situations. In some embodiments, some aspects PHY and/or MAC data unit format are altered relative to the current IEEE 802.11 format to reduce overhead for long range transmission defined by the long range communication protocol. Additionally or alternatively, techniques described below are utilized to reduce overhead associated with transmission of non-data data units, such as control data units, in some embodiments. Further, in some embodiments, techniques described below are utilized to reduce power consumption in at least some devices operating according to the long range communication protocol.

Figure 1:
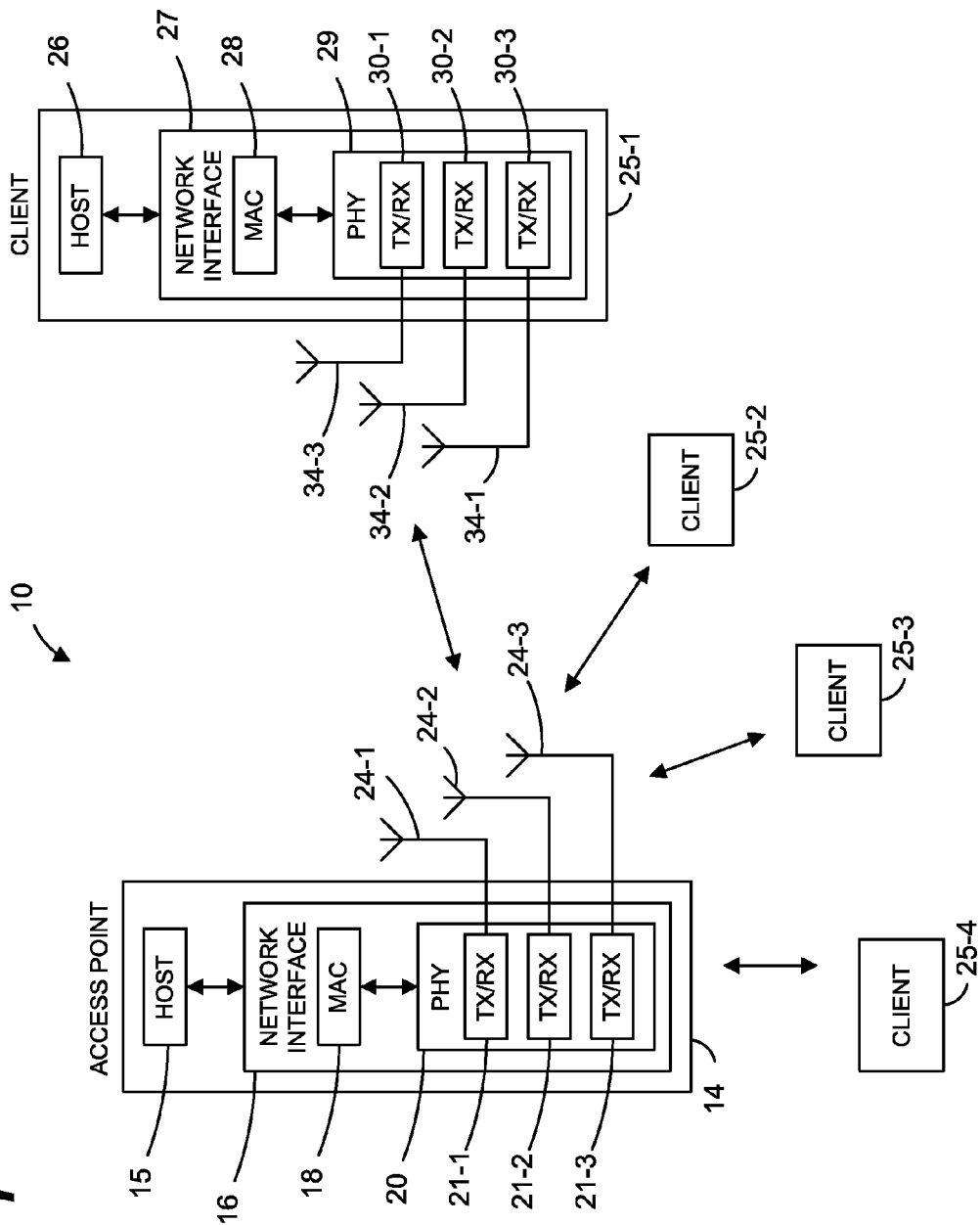
FIG. 1 is a block diagram of an example wireless local area network (WLAN), according to an embodiment.

FIG. 1 is a block diagram of an example wireless local area network (WLAN) 10 including an AP 14, according to an embodiment. The AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 further includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the long range communication protocol.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In some embodiments, one, some, or all of the client stations 25-2, 25-3, and 25-4 has/have a structure the same as or similar to the client station 25-1. In these embodiments, the client stations 25 structured the same as or similar to the client station 25-1 have a same or a different number of transceivers and antennas. For example, the client station 25-2 has only two transceivers and two antennas, according to an embodiment.

In various embodiments, the PHY processing unit 20 of the AP 14 is configured to generate data units conforming to the long range communication protocol and having formats described hereinafter. The transceiver(s) 21 is/are configured to transmit the generated data units via the antenna(s) 24. Similarly, the transceiver(s) 24 is/are configured to receive such data units via the antenna(s) 24. The PHY processing unit 20 of the AP 14 is also configured to process received data units conforming to the long range communication protocol and having formats described hereinafter, according to various embodiments.

In various embodiments, the PHY processing unit 29 of the client device 25-1 is configured to generate data units conforming to the long range communication protocol (e.g., regular mode and/or low rate mode data units according to the long range communication protocol) and having formats described hereinafter. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is also configured to process received data units conforming to the long range communication protocol and having formats described hereinafter, according to various embodiments.

Figure 2:
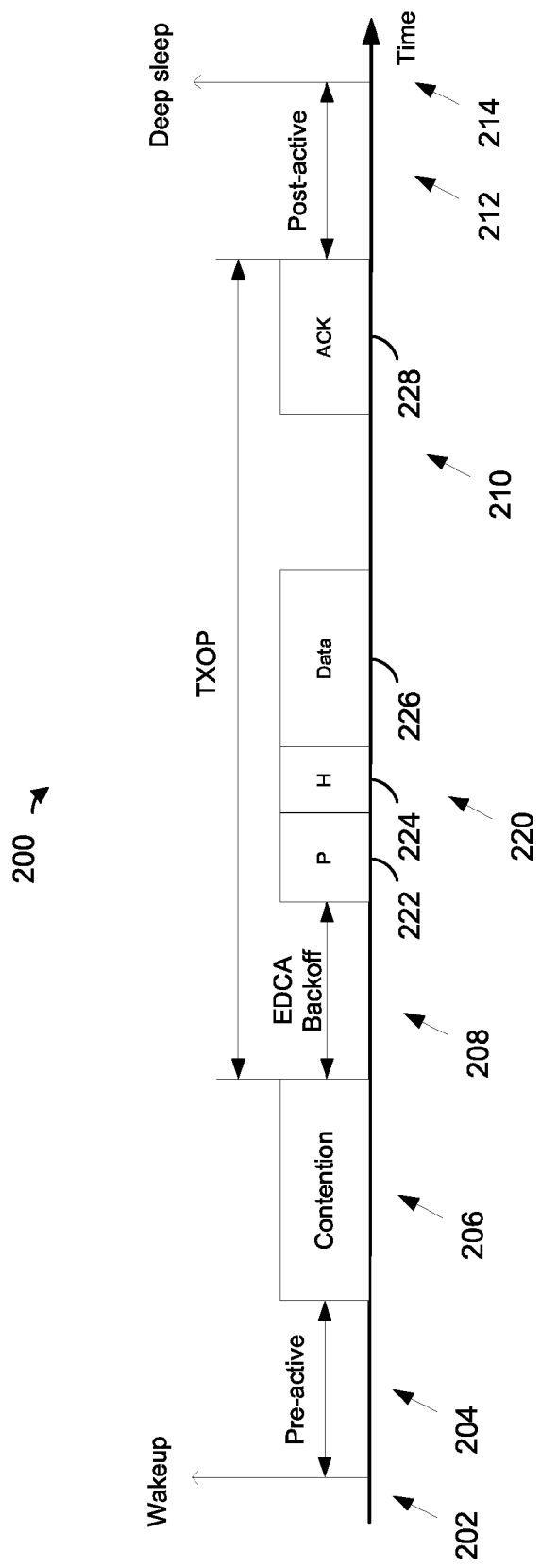
FIG. 2 is a diagram of a frame exchange sequence between two devices, according to an embodiment.

FIG. 2 is a diagram of a frame exchange sequence 200 between a Station A and a Station B, according to an embodiment. Referring to FIG. 1, in an embodiment, Station A is a client station 25 (e.g., the client station 25-1) and Station B is the AP 14. With continued reference to FIG. 1, in another embodiment, Station A is the AP 14 and Station B is a client station 25 (e.g., the client station 25-1). As another example, in yet another embodiment, Station A is one of the client stations 25 (e.g., the client station 25-1) and Station B is another one of the client stations 25 (e.g., the client station 25-2)

Referring to FIG. 2, Station A wakes up at a time 202 and conducts certain "pre-active" operations during a time period 204. During a time period 206, Station A assesses a communication medium in a vicinity of Station A by conducting a carrier sensing procedure, for example. If the communication medium is determined to be clear and available for transmission by Station A, then Station A gains contention free access to the communication medium lasting for a time defined by a transmission opportunity (TXOP) time period 208. Upon gaining contention free access to the medium, Station A delays transmission for a certain period of time, as defined by an enhanced distributed channel access (EDCA) backoff period 208, determined based on a traffic type for data to be transmitted, for example. Upon expiration of the EDCA backoff period 208, Station A initiates transmission of a data unit 220 to a Station B. The data unit 220 includes a PHY preamble portion 222, a MAC header portion 224 and a data portion 226. During a time period 210, Station A receives an acknowledgement (ACK) data unit 228 from Station B. Upon receiving the acknowledgement data unit 228 informing Station A that the data unit 220 was successfully received by the Station B, and after conducting certain "post-active" operations during a time period 212, the station enters deep sleep mode at a time 214.

The frame exchange sequence 200 generally corresponds to a frame exchange sequence defined by the current 802.11 Standard. However, due to low data rates generally defined by the long range protocol, each time period in FIG. 2 is longer for long range transmission compared to a similar transmission sequence at data rates associated with the current 802.11 Standard, resulting in greater amount of overhead relative to transmission of data (i.e., the data portion 226 of the data unit 220). For reference, FIG. 3 is a table 300 illustrating transmission efficiency analysis for data unit transmission at several data rates being contemplated for the IEEE 802.11af and 802.11ah Standards, using data unit formats defined by the current IEEE 802.11 Standard. As can be seen in Table 300, at least some transmission sequence portions cause considerable amounts of overhead at low data rates associated with the long range communication protocol. For example, overhead caused by a MAC header (col. 302), such as the MAC header 224 in FIG. 2, can be as high as 16.9% relative to an entire transmission sequence, in some situations. Similarly, overhead caused by an ACK data unit (col. 304), such as the ACK data unit 228 in FIG. 2 can be as high as 18.62% relative to the entire transmission sequence, in some situations. In some embodiments, data unit formats described below reduce transmission overhead and thereby increase transmission efficiency for long range communication between various devices operating according to the long range communication protocol.

Figure 4:
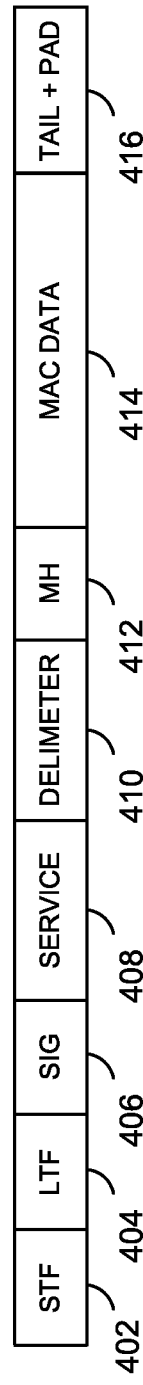
FIG. 4 is a diagram of a prior art data.
Figure 6:
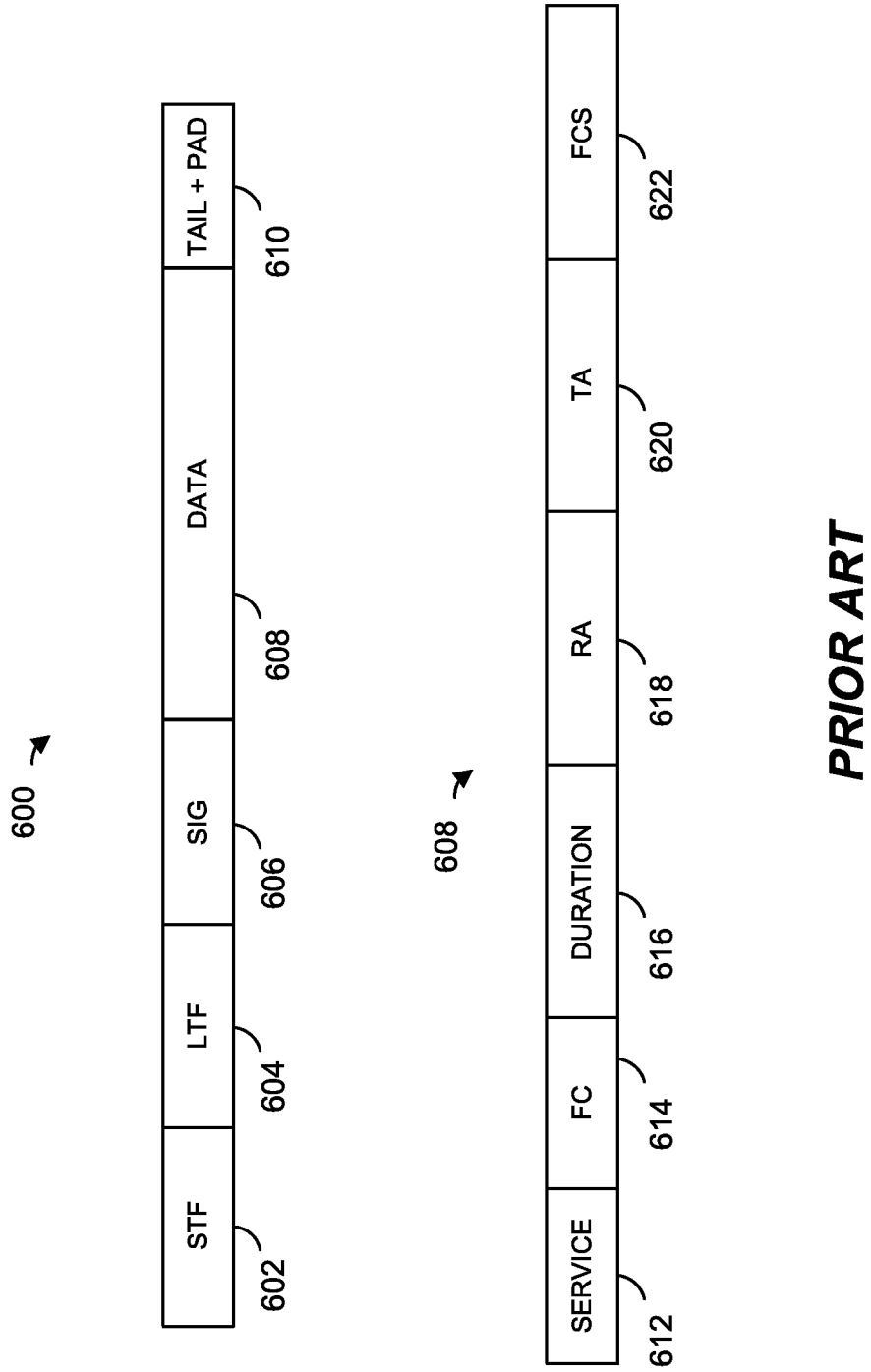
FIG. 6 is a diagram of a prior art control data unit.

For reference, FIGS. 4-6 illustrate some prior art PHY and MAC data unit formats in accordance with the current 802.11 Standard.

FIG. 4 is a diagram of a prior art data unit 400 formatted according to the current 802.11 Standard. The data unit 400 includes a PHY preamble portion 402, which includes a sort training field (STF) 406, a long training field (LTF) 408 and a signal field 410. The signal field 410 is used for transmitting various physical layer information regarding physical layer transmission of the data unit 400, such as a modulation and coding scheme (MCS) used for transmission of the data unit 400, etc. The preamble portion 402 is followed by a service field 412 and a delimiter field 414. The data unit 400 also includes a MAC header 416, a MAC data portion 418, a frame control check field 418, and a tail and padding field 420. The MAC header 416 generally carries user specific information, such as an address (or addresses) identifying the transmitter and/or the intended recipient (or recipients) of the data unit 400, for example. The STF field 402, the LTF field 404 and the SIG field 406 comprise a PHY preamble of the data unit 400. The PHY preamble is generally transmitted omni-directionally and using relatively low modulation (e.g. BPSK) and a relatively low coding rate, and, therefore, can typically be received and properly interpreted by all or most client stations within operating range of transmitting device. The remaining portions of the data unit 400 are typically transmitted at a higher rate (using a higher modulation order and/or coding rate) and may be beamformed in a direction of the intended receiver of the data unit 400.

FIG. 5A is a diagram of a prior art medium access control (MAC) frame 500. The MAC frame 500 corresponds to the fields 412-416 of the data unit 400 of FIG. 4, for example. The MAC frame 500 includes a MAC header 502, a frame body 518, and a frame sequence check field 520. The number above each field in FIG. 5A indicates the number of octets occupied by the corresponding field. Accordingly, the MAC header 502 includes a frame control field 504 (2 octets), a duration/ID field 508 (2 octets), a first address (Address 1) field 510-1 (6 octets), a second address (Address 2) field 510-2 (6 octets), a third address (Address 3) field (6 octets) 510-3, a sequence control field 512 (2 octets), a fourth address (Address 4) field 510-4 (6 octets), a QoS control field 514 (2 octets), an HT control field 516 (4 octets). The data unit 500 also includes frame body 518 and a four-octet frame check sequence (FCS) field 520. Each of the address fields 510 is a 48 bit (6 octet) field that includes a globally unique MAC address of a device associated with the data unit 500, such as a transmitting device of the data unit 500, a receiving device of the data unit 500, etc. In general, the MAC header 502 occupies 36 octets of the MAC frame 500.

FIG. 5B is a diagram of a prior art frame control field 504 included in the data unit 500 of FIG. 5A. The frame control field 504 includes a protocol version subfield 552, a type subfield 554, a subtype subfield 556, a to distribution system (ToDS) subfield 558, a from distribution system (FromDS) subfield 560, a more fragments subfield 562, a retry subfield 564, a power managements subfield 566, a more data subfield 568, a protected frame subfield 570 and an order subfield 572.

FIG. 6 is a diagram of a prior art control data unit 600 formatted according to the current 802.11 Standard. The control data unit 600 is formatted the same as or similar to a regular data unit format defined by the current IEEE 802.11 Standard, such as the data unit 400 of FIG. 5 with control data unit specific information included in the MAC data portion of the control data unit 600. Similar to the data unit 400, the control data unit 600 includes a PHY preamble 602 which, in turn, includes an STF field 602, an LTF field 604 and a SIG field 606. The control data unit 600 also includes a data portion 608 and a tail and padding field 610. The data portion 608 includes a service field 612, an FC field 614, a duration field 616, an RA field 618, a TA field 620, and an FCS field 622. The TA field 620 is omitted from the control data unit 600 in some situations, for example when the transmitter of the control data unit 600 need not be identified in the control data unit 600.

Figure 7A:
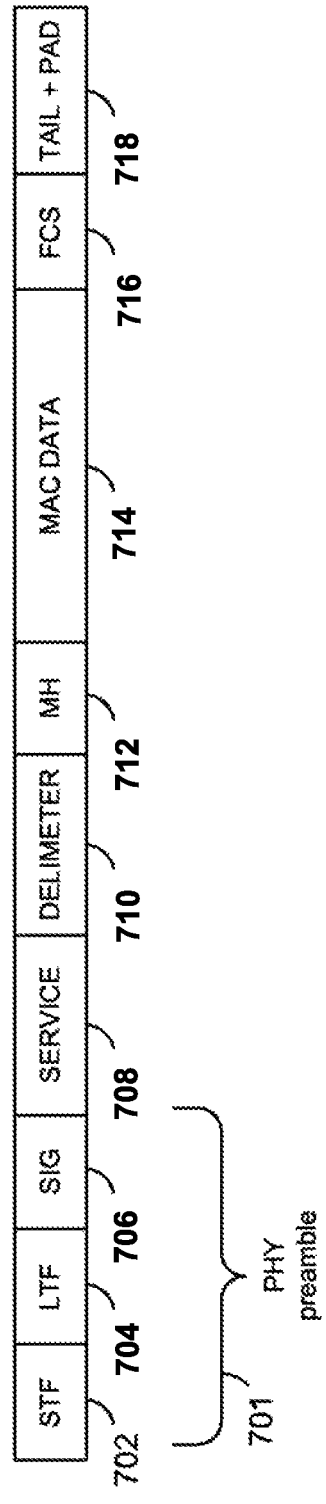
FIG. 7A is a diagram of an example long range data unit, according to an embodiment.

FIG. 7A is a diagram of an example long range data unit 700 formatted according to a data unit format defined by the long range communication protocol, according to an embodiment. With reference to FIG. 1, the AP 14 is configured to transmit the data unit 700 to the client station 25-1 using OFDM modulation, according to an embodiment. In an embodiment, the client station 25-1 is also configured to transmit the data unit 700 to the AP 14 using OFDM modulation. The data unit 700 has a format similar to the data unit 400 of FIG. 4, but various fields of the data unit 700 are altered relative to the corresponding fields of the data unit 400.

The data unit 700 includes an STF field 702, an LTF field 704 and a SIG field 710. The STF field 702, the LTF field 704 and the SIG field 706 comprise a PHY preamble 701 of the data unit 700, in an embodiment. The data unit 700 also includes a service field 708 and a delimiter 710. The data unit 700 further includes a MAC header (MH) 712, a MAC data portion 716, an FCS field 718 and a tail/padding field 720. In an embodiment, the PHY preamble 701 is transmitted omni-directionally and using relatively low modulation (e.g. BPSK) and a relatively low coding rate (e.g., according to the lowest MCS defined by the long range communication protocol), and, therefore, can typically be received and properly interpreted by all or most client stations within a communication range of transmitting device. The remaining portions of the data unit 700 are typically transmitted at a higher rate (using a higher modulation order and/or coding rate) and may be beamformed in a direction of the intended receiver of the data unit 700.

Figure 7B:
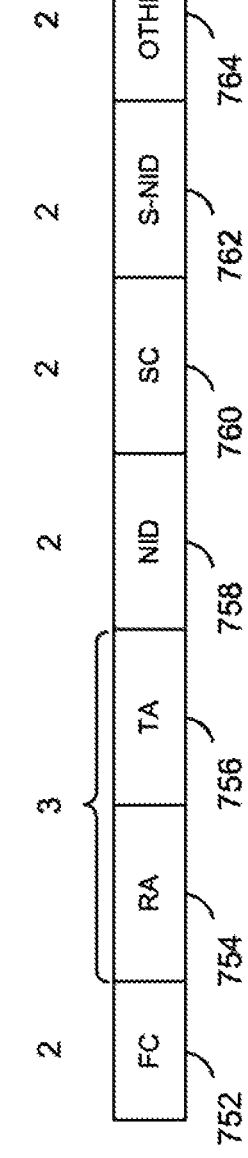
FIG. 7B is a diagram of a MAC header included in the data unit of FIG. 7A, according to an embodiment.

FIG. 7B is a diagram of a MAC header 750 included in the data unit 700, according to an embodiment. The number above each field of the MAC header 750 indicates the number of octets (or bytes) occupied by the corresponding field of the MAC header 750, according to an example embodiment. In an embodiment, the MAC header 750 includes a frame control field 752, a receiver address (RA) field 754, a transmitter address (TA) field 756, a network ID (NID) field 758, a sequence control (SC) field 760, an S-NID field 762 and an "other" field 764. In various embodiments, the number of bits in the MAC header 750 is reduced relative to the MAC header 502 of FIG. 5. In the embodiment of FIG. 7B, each of the FC field 752, the SC field 760, the S-NID field 762 and the 'other' field 764 occupies two octets of the MAC header 750. To reduce the size of the MAC header 750 relative to the MAC header 502, in some embodiments, certain fields included in the MAC header 502 are omitted from the MAC header 750 or are moved to the SIG field 706 and/or the service field 708 of the data unit 700. For example, in an embodiment, the duration/ID field included in the MAC header 502 is omitted from the MAC header 702. As another example, a traffic ID (TID) element included in the QoS control field 516 of the MAC header 502 is included in the service field 710 of the data unit 700 or in the frame control field 752 of the MAC header 750, and the QoS control field is omitted from the MAC header 750, according to an embodiment.

In some embodiments, the MAC header 750 includes one or more shorter address fields to identify devices associated with the data unit 700 compared to the address fields included for this purpose in the MAC header 502. Accordingly, the number of address bits in the MAC header 750 is reduced relative to the number of address bits in the MAC header 502, in such embodiments. For example, in an embodiment, the MAC header 750 identifies a device associated with the data unit 700 by including a short, local address of the device within a network and a short network ID identifying the network. A local address of a device is an address that is unique with a wireless network associated with the device but is not unique with respect to other wireless networks, in an embodiment. Accordingly, at least some of the globally unique MAC addresses in the address fields 510 of the MAC header 502 are replaced in the MAC header 750 by shorter local addresses of the devices identified in the data unit 700. For example, in an embodiment, the RA field 754 of the MAC header 750 includes an association identification (AID) assigned to the receiving device of the data unit 700 (e.g., the AP 14) by an AP during association process with the AP. Similarly, in an embodiment, the TA field 756 of the MAC header 750 includes an AID associated with the transmitter of the data unit 700. Further, the NID subfield 758 includes a network ID, or a basic service set (BSS) ID associated with the AP. In an embodiment, each of the RA field 754 and the TA field 756 is limited to 12-bits and, accordingly, includes a device AID represented by a maximum of 12 bits. A network ID included in the NID field 758 is a 2-byte (or 2-octet) network ID, according to an embodiment. In an embodiment, a device associated with the data unit 700 is uniquely identified in the MAC header 750 by a shorter local address of the device, as long as the network address in the NID subfield 758 is not the same as a network address associated with a neighboring network, such as an overlapping BSS, for example.

In various embodiments, various techniques are utilized to ensure that addresses associated with neighboring and/or overlapping networks are unique with respect to each other. For example, in an embodiment, a newly created AP (e.g., the AP 14) scans neighboring networks that are currently in operation and selects a network ID that does not conflict with the scanned networks. In some embodiments, the AP continuously or periodically scans neighboring networks to detect network ID conflicts with neighboring networks. Alternatively or additionally, in some embodiments, a client station detects presence of two or more APs that are using a common network address and reports the common address issue to at least one of the APs. In an embodiment, in response to detecting a network ID conflict and/or in response to receiving an indication of the network ID network conflict from a client station, an AP selects a new network ID and announces the new network ID to client stations associated with the AP.

In some embodiments, however, a client station operating in power save or deep sleep modes is not active for certain periods of time and is unable to scan neighboring networks to detects address conflicts and to report such conflicts to the AP during a down time. As a result, in some embodiment and/or scenarios, network ID conflict detection schemes described above are insufficient, and alternative techniques are utilized. For example, in an embodiment, the RA field 754 of the MAC header 750 includes a longer, globally unique address of the receiving device (such as a 48 bit MAC address of the receiving device), while the TA subfield 756 and the Net ID address field 758 each includes a respective shorter local address. In another embodiment, the MAC header 750 includes one or more additional subfields that carry a global receiver address of the intended receiver and/or a globally unique network address, such as a unique BSSID, for example.

In some embodiments, to avoid including full-MAC addresses in the MAC header 750 while still allowing a receiving device of the data unit 700 to correctly and unambiguously determine that the receiving device is an intended receiver of the data unit 700, a global MAC receiver address or a global network address (such as a global AP address) is included in calculation of the frame check sequence included in the FCS field 718 of the data unit 700 but is not actually included in the data unit 700. FIGS. 8A-8C are diagrams illustrating frame check sequence calculation at a transmitting device (e.g., the AP14), according to some such embodiments. In an embodiment, a transmitting device (e.g., the AP14) transmits a data unit 800 (FIG. 8A) to a receiving device (e.g., the client station 25-1). The data unit 800 is the same as or similar to the data unit 700 of FIG. 7. The data unit 800 includes a frame header 802, a data portion 804 and an FCS field 806. The frame header 802 includes a short local address, such as an AID associated with the transmitting device. Similarly, the frame header 802 includes a short local address of the receiving devices, such as an AID associated with the receiving device. Further, the frame header 802 includes a short network ID identifying the network or the BSS associated with the transmitting and the receiving device. In an embodiment, frame check sequence calculation for the data unit 800 is performed using a longer, global address of the receiving device (such as a 48 bit MAC address of the receiving device), allowing the receiving device to be uniquely identified even if a neighboring network, such as an overlapping BSS, is utilizing a network ID that is the same as the network ID used by the network associated with the data unit 800. FIG. 8B illustrates fields 830 used for FCS calculation, according to one such embodiment. In the embodiment of FIG. 8B, a longer receiver address (L-RA) 808 is appended to the data portion 804 of the data unit 800 for the purpose of calculating FCS to be included in the FCS field 806 of the data unit 800. FIG. 8C illustrates fields 850 used for FCS calculation, according to another embodiment. In the embodiment of FIG. 8C, a longer receiver address (L-RA) 808 is pre-pended to the frame header field 802 of the data unit 800 for the purpose of calculating FCS to be included in the FCS field 806 of the data unit 800.

Figure 9A:
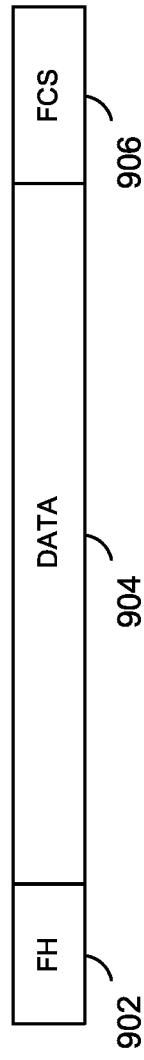
FIGS. 9A-9C are diagrams illustrating FCS calculation at a receiving device, according to some embodiments.
Figure 9B:
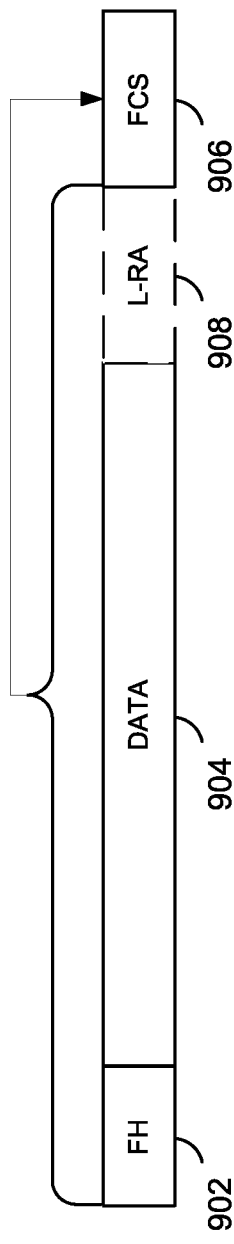
Figure 9C:
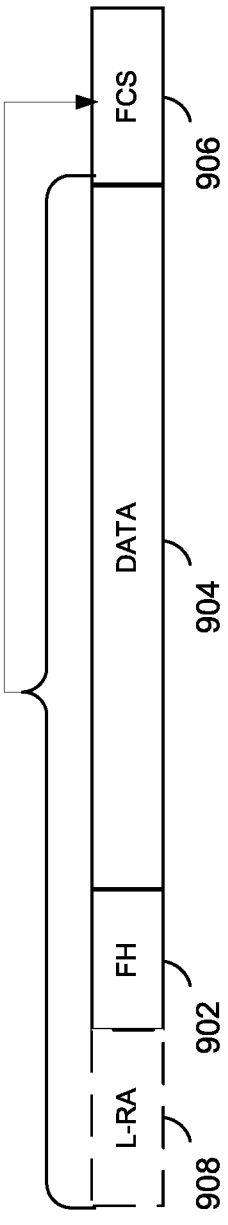

FIGS. 9A-9C are diagrams illustrating frame check sequence calculation at a receiving device (e.g., client station 25-1), according to some embodiments. In an embodiment, a receiving device (e.g., the client station 25-1) receives a data unit 900 from a transmitting device (e.g., the AP 14). The data unit 900 is the same as or similar to the data unit 700 of FIG. 7. The data unit 900 includes a frame header 902, a data portion 904 and an FCS field 906. The FCS field 906 includes FCS calculated at the transmitting device using a long receiver address of the receiving device. Accordingly, the receiving device includes a corresponding long receiver address in FCS calculation when checking correctness of the received data unit 900 at the receiving device. The placement of the long receiver address within the data unit 900 when FCS is calculated at the receiving device depends on the placement of the L-RA within the data unit 900 when FCS calculation was performed at the transmitting device, according to an embodiment. FIG. 9B illustrates fields 930 included in FCS calculation, according to one such embodiment. In the embodiment of FIG. 9B, the long receiver address (L-RA) 908 is appended to the data portion 904 of the data unit 900 for the purpose of calculating FCS to check correctness of the received data unit 900. FIG. 9C illustrates fields 950 used for FCS calculation, according to another embodiment. In the embodiment of FIG. 9C, a longer receiver address (L-RA) 908 is pre-pended to the frame header field 902 of the data unit 900 for the purpose of calculating FCS to check correctness of the received data unit 900. If the calculated FCS does not match the expected FCS, then the data unit 900 may have been corrupted during transmission of the data unit 900 or the receiving device is not the intended receiver of the data unit 900. In either case, the receiving device discards the data unit 900, according to an embodiment.

In some embodiments and/or scenarios, a client station receiving the data unit 900 is associated with several global MAC receiver addresses. Accordingly, in an embodiment, to properly determine whether a multi-address receiver is an intended recipient of the data unit 900 based on FCS included in the FCS field 906 of the data unit 900, the receiving device needs to first determine the long receiver address that should be included in FCS calculation. In an embodiment, the receiving device selects a long RA address that should be included in the FCS calculation based on a short RA address and a short network ID address included in the frame header 802 of the data unit 900. Referring to FIG. 9B, because in this embodiment the long receiver address L-RA 908 is appended, for FCS calculation, to the data portion 904 of the data unit 900, FCS calculation begins before the correct L-RA address is actually selected, according to this embodiment. In other words, in this embodiment, L-RA selection is performed concurrently with FCS calculation, and the selected address is appended to the data portion 904 of the data unit 908 prior to completion of the FCS calculation. Referring to FIG. 8C, in this embodiment, because the long receiver L-RA address 908 is pre-appended, for FCS calculation, to the frame header 908 of the data unit 900, FH 902 of the data unit 900 is first cashed in memory at the receiving device, and the correct L-RA is then selected based on information included in the FH 902 of the data unit 900 (e.g., the short RA and short NID). The selected L-RA is then pre-pended to the FH 902 of the data unit 900, and the data unit 900 with pre-pended L-RA 908 is then passed for FCS calculation, according to this embodiment.

Figure 10:
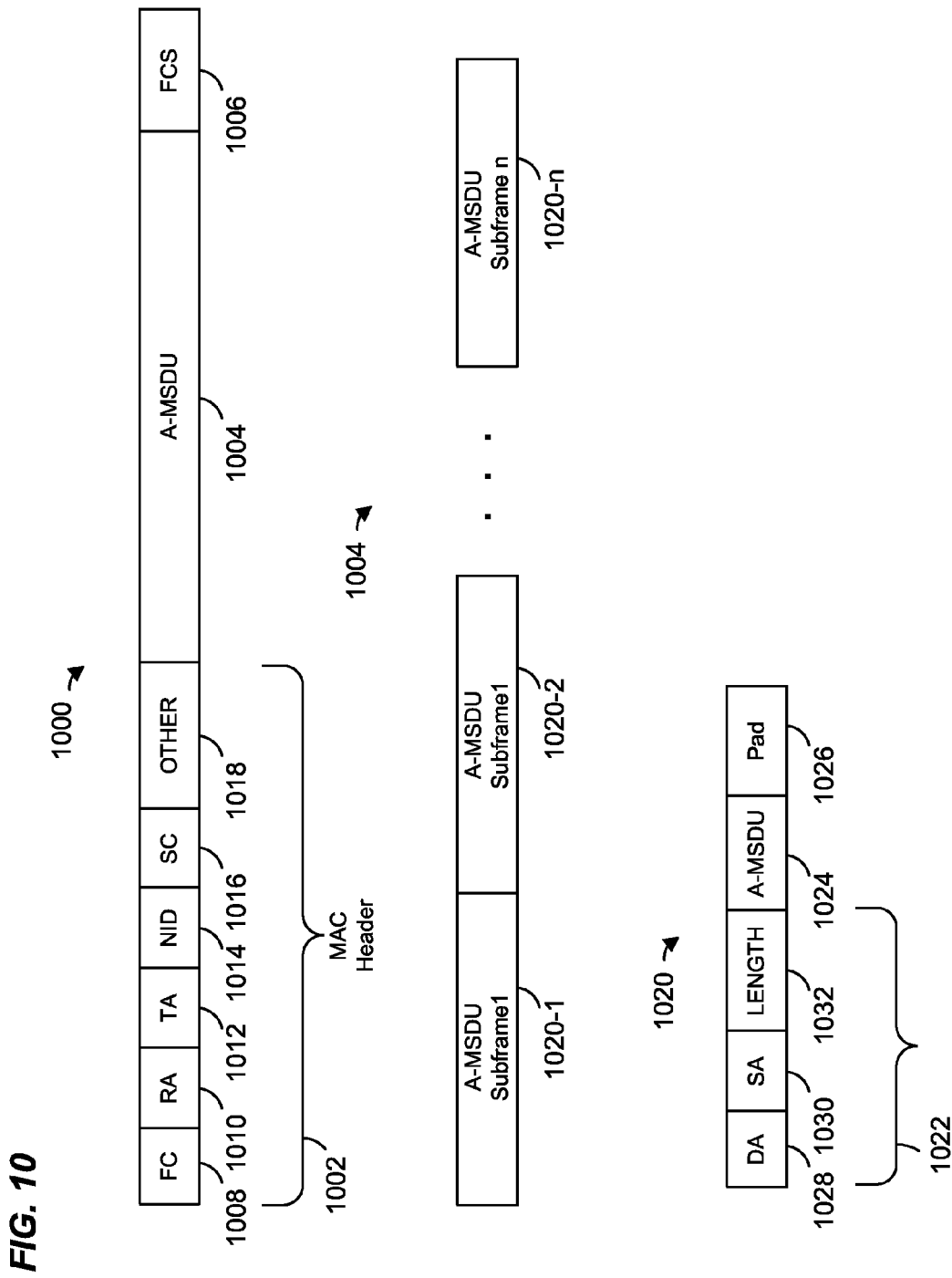
FIG. 10 is a diagram of a multi-cast data unit, according to an embodiment.

FIG. 10 is a diagram of a multi-cast data unit 1000 formatted as defined by the long range communication protocol, according to an embodiment. In an embodiment, the AP 14 is configured to transmit to multiple client stations 25. The multi-cast data unit 1000 is similar to the data unit 700 of FIG. 7 and includes a MAC header 1002, an aggregated MSDU portion 1004 and an FCS field 1006. In an embodiment, the MAC header 1002 that is the same as or similar to the MAC header 650 of FIG. 6B. The MAC header 1002 includes an FC field 1008, a short RA field 1010, a short TA field 1012, a short NID field 1014, a sequence control field 1016 and an "other" field 1018. The A-MSDU portion 1004 includes one or more A-MSDU subframes 1020, and each A-MSDU subframe 1020 includes a subframe header 1022, a subframe data portion 1024, and a padding field 1026. Each subframe header 1022 includes a destination address (DA) field 1028, a source address (SA) field 1030, a length field 1032.

In an embodiment, when an AP (e.g., the AP 14) transmits the data unit 1000 to a plurality of client station, the AP sets the RA field 1010 to a short broadcast address (e.g., short broadcast AID) associated with a network in which the AP operates (e.g., the network 10), and sets the NID field 1014 to a short address or a short ID identifying the network (e.g., a short BSS ID). In an embodiment, each subframe 1020 of the data unit 1000 is intended to be received by one or more client stations in the network. To inform a client station that a particular subframe 1020 is intended for the client station, the AP sets the DA field 1028 of the subframe header 1022 of the intended subframe 1020 includes the long address (such as the MAC address) of the client station or a long multi-cast address corresponding to a multi-cast group which includes the client station. Because the RA field 1010 is set to a broadcast address, each client station associated with the network will process the A-MSDU portion 1004 of the data unit 1000 and will determine whether the A-MSDU 1004 includes any subframes intended for the client station, according to an embodiment.

The SA field 1030 of a subframe 1020 is set to an address of the source device that originated the subframe 1020, in an embodiment. Alternatively, in some embodiments and/or scenarios, for example when source of a subframe 1020 is the transmitting device of the data unit 1000, the SA field 1030 is omitted from the header of the subframe 1020. In some situations, the multi-cast data unit 1000 is transmitted as a unit-cast data unit intended for a single client station. In such embodiments and/or scenarios, the RA field 1010 of the data unit 1000 is set to a short address (e.g., a short AID) of the intended client station.

In some embodiments, a client station 25 communicates with another client station 25 directly and via the AP 14, in at least some situations. In some such situations, a source client stations that transmits a data unit (e.g., the data unit 700 of FIG. 7) to a destination client station obtains the short, local address (e.g., AID) of the destination client station from the AP 14 by transmitting a data unit requesting the AID to the AP 14, for example. When transmitting the data unit 700 to request the short address of the destination client station, the source client station encapsulates the long address of the destination client station in the MAC data portion of the data unit 700, in an embodiment.

Figure 11:
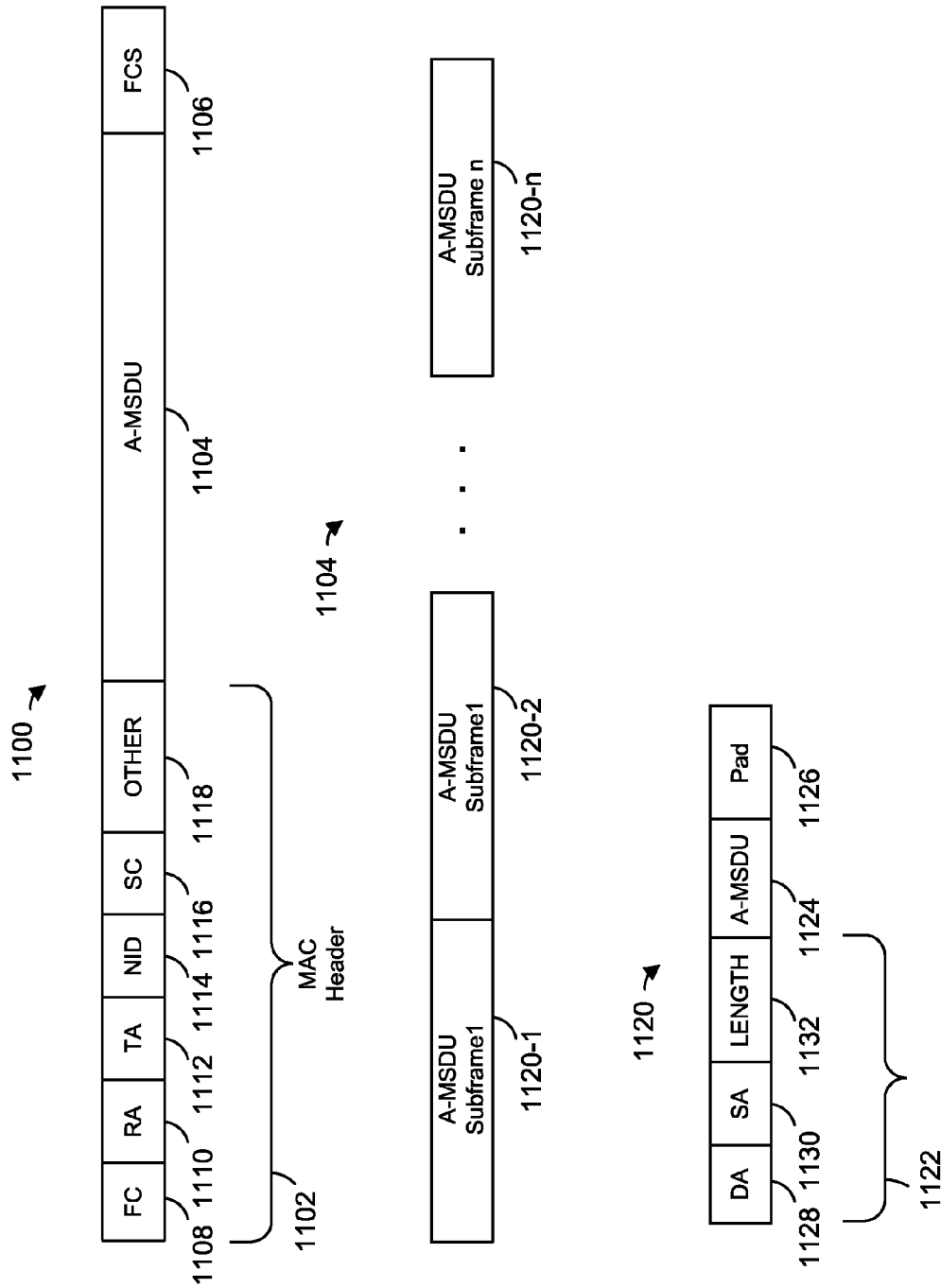
FIG. 11 is a diagram of a data unit in which global MAC address encapsulation is utilized, according to an embodiment.

FIG. 11 is a diagram of a data unit 1000 in which address encapsulation is utilized, according to an embodiment. In an embodiment, a client station 25 is configured to transmit the data unit 1100 to the AP 14, for example to request an AID address of another client station 25 from the AP 14. The data unit 1100 is similar to the multi-cast data unit 1000 of FIG. 10 and includes a MAC header 1102, an aggregated MSDU portion 1104 and an FCS field 1106. In an embodiment, the MAC header 1102 that is the same as or similar to the MAC header 750 of FIG. 7B. The MAC header 1102 includes an FC field 1108, a short RA field 1110, a short TA field 1112, a short NID field 1114, a sequence control field 1116 and an "other" field 1118. The A-MSDU portion 1004 includes one or more A-MSDU subframes 1120, and each A-MSDU subframe 1120 includes a subframe header 1122, a subframe data portion 1024, and a padding field 1026. Each subframe header 1122 includes a destination address (DA) field 1140, a source address (SA) field 1142, a length field 1144.

The SA field 1130 of a subframe 1120 is set to an address of the source device that originated the subframe 1120, in an embodiment. Alternatively, in some embodiments and/or scenarios, for example when source of a subframe 1120 is the transmitting device of the data unit 1100, the SA field 1130 is omitted from the header of the subframe 1120. In some situations, the multi-cast data unit 1100 is transmitted as a unit-cast data unit intended for a single client station. In such embodiments and/or scenarios, the RA field 1110 of the data unit 1100 is set to a short address (e.g., a short AID) of the intended client station.

Figure 12:
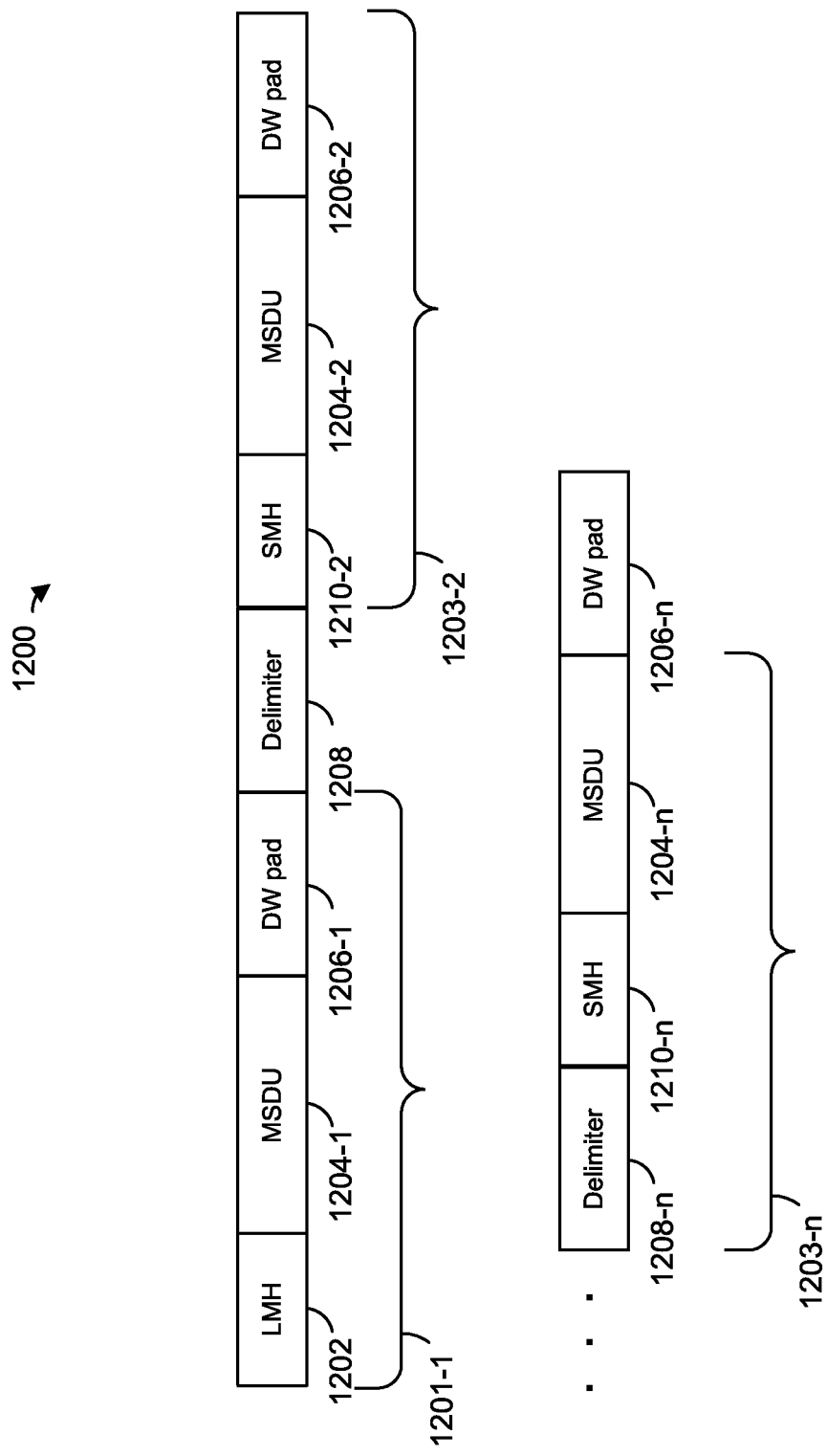
FIG. 12 is a diagram of an aggregated MAC protocol data unit (A-MPDU), according to an embodiment.

FIG. 12 is a diagram of an aggregated MAC protocol data unit (A-MPDU) 1200, according to an embodiment. In an embodiment, the AP 14 is configured to transmit the A-MPDU 1200 to the client station 25-1. The client station 25-1 is also configured to transmit the A-MPDU 1200 to the AP 14, in an embodiment. The A-MPDU 1200 includes a long MSDU portion 1201 followed by n short MSDU portions 1203. The long MSDU portion 1201 includes a long MAC header 1202, a MAC protocol data unit (MPDU) 1204-1, a dword (DW) padding field 1206-1. Each of the short MSDU portions 1203 includes a short MAC header 1210, an MSDU portion 1212 and a DW padding field 1206. A delimiter 1208 is inserted before each short MSDU portion 1208, in an embodiment. In an embodiment, the LMH 1202 includes general header information related to the A-MPDU 1200, such as the source and destination address of the A-MPDU 1200. As an example, in an embodiment, the LMH 1202 is the same as or similar to the MAC header 502 of FIG. 5 or the MAC header 740 of FIG. 7B. Each SHM 1210 includes information specific to the corresponding MSDU portion 1203, such as a portion of a frame control field of the long header 1202 and/or a sequence control field of the long header 1202 specific to the corresponding MSDU 1203.

Various data unit formats and early packet filtering techniques described below allow a receiving device to filter data units by determining that the receiving device is not an intended receiver of a data unit by processing a relatively small portion of the data unit, such as by processing only the PHY preamble of the data unit or the PHY preamble and the service field of the data unit, for example. Such data unit formats and techniques allow receiving devices to save power by discarding data units based on processing of only early portions of the data units.

Referring to FIG. 1, in an embodiment, the network 10 includes client stations of various device types. In an embodiment, the network 10 includes one or more low power sensor client stations and/or battery powered sensor client stations, such as smart sensor network devices, for example. Additionally, the network 10 includes one or more client stations offloaded to the network 10 from a different network, such as a 3G network, for example, according to an embodiment. For example, the client station 25-1 is a low power sensor device, the client station 25-2 is a battery power sensor device, and the client station 25-3 is an "offloading" client station, in an example embodiment. In some embodiments, traffic associated with offloading client stations dominates the medium of the network 10 with offloading client stations actively transmitting and receiving data for longer periods of time and/or more often compared to sensor client stations. Further sensor client stations typically operate under power constraints, in at least some embodiments.

In an embodiment, to allow a client station to conserve power by quickly determining that the client station is not an intended receiver of the data unit, a transmitting device of the data unit includes certain information identifying traffic and/or device type associated with the data unit in an early portion of the data unit, such as in the PHY preamble of the data unit. Accordingly, in such embodiments, a receiving device, such as a client station 25, is able to filter out a data unit after processing only a portion of the data unit and determining that the receiving device is not an intended receiver of the data unit. In an embodiment, a receiving device filters out a data unit if the receiving device type does not match the device type and/or does not support the type of traffic indicated in an early portion of (e.g., PHY preamble) of the data unit.

Referring to FIG. 7, in an embodiment, the signal field 708 of the data unit 700 includes an indication of whether data unit 700 is directed towards an AP or towards a client station. In one embodiment, for example, the signal field 708 includes ToAP/ToSTA indication bit to indicate the direction of travel of the data unit 700. As an example, in this embodiment, if the data unit 700 is being transmitted from a client station (e.g., the client station 25-1) to an AP (e.g., the AP 14), then ToAP/ToSTA bit in the signal field 708 is set to a logic one (1) informing other client stations that the client stations need not process the remaining portions of the data unit 700. On the other hand, if the data unit 700 is being transmitted from an AP to a client station (or from one client station to another client station), then ToAP/ToSTA bit in the signal field 708 is set to a logic zero (0) informing other client stations that the client stations should continue processing the data unit 700.

In some embodiments, the signal field 708 of the data unit 700 includes an indicator indicating whether the data unit 700 (or another early portion of the data unit 700, such as the service field 710 or an early portion of the MAC header 714) includes data offloaded from a network separate from network 10, such as a mobile telephony network (e.g., 3G network), for example. Additionally or alternatively, in an embodiment, the indicator indicates whether the data unit was generated by a device that supports offloading of data from a mobile telephony network and/or whether the data unit is addressed to such a device. In an embodiment, the indicator also indicates whether the data is addressed to a power constrained device, such as a sensor. Alternatively, in another embodiment the signal field 708 of the data unit 700 includes an additional indicator to indicate whether the data unit is addressed to a power constrained device. In an embodiment, including offloading indication in an early portion of the data unit 700, such as in the signal field 708 of the data unit 700, allows non-offloading client stations, such as power constrained client stations, to determine that the data unit 700 is not a sensor data unit and need not be processed by a sensor client station. Accordingly, in some embodiments, a sensor client station conserves power by not processing the remainder of the data unit 700 in response to determining that the data unit 700 is an offloading data unit and not a sensor data unit.

In some embodiments, device and/or traffic type of the data unit 700 is indicated via an address associated with a device that transmits the data unit 700 and/or a device that is an intended recipient of the data unit 700. For example, in some embodiments, each client station associated with an AP is assigned an association identification (AID) address by the AP. In one such embodiment, the association identification (AID) address space in a network associated with the AP is separated into address groups, and the AP assigns an AID to a client station based on the type of the client station. For example, in an embodiment, the AID address space in the network 10 includes two or more of the following groups: a first address group used for offloading client stations (e.g., client station 25-1), a second address group used for low power sensor client stations (e.g., client station 25-2), and a third address used for battery powered sensor client stations (e.g., client station 25-3).

In some embodiment, an early portion of the data unit 700, such as, for example, the PHY preamble 701, the service field 710, or an early portion (e.g., first few bits) of the MAC header 714 of the data unit 700 includes at least a partial AID address of the intended receiver of the data unit 700, allowing a client station to process the early portion of the data unit 700 to determine the device type of the intended receiver of the data unit 700. In response to determining that a client station does not match the device type of the intended receiver of the data unit 700, the client station filters out the data unit 700 without processing the remainder of the data unit 700, according to an embodiment. Thus, a power constrained client station, such as a low power or a battery sensor device, conserves power by filtering out the data unit 700 if the data unit 700 is intended for an offloading device, for example.

Figure 13:
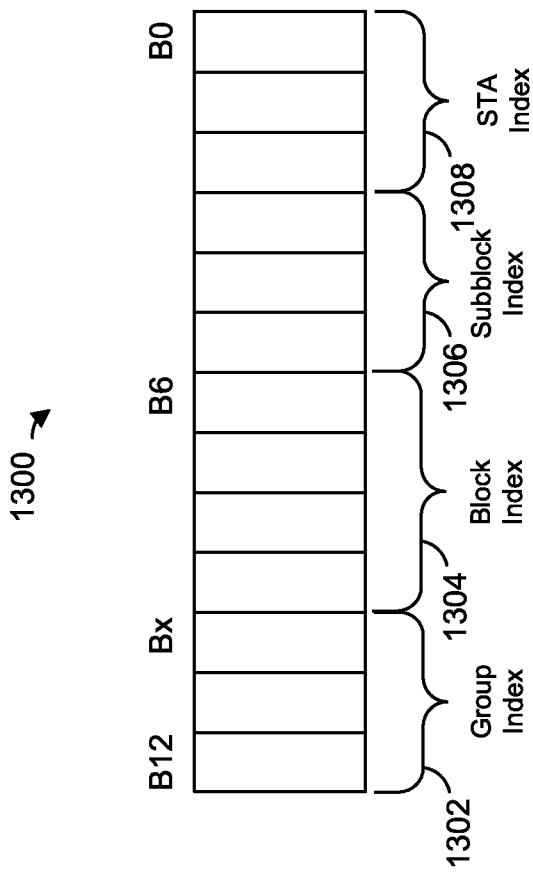
FIG. 13 is a diagram of an example bit allocation for an association identification (AID) address, according to an embodiment.

FIG. 13 is a diagram of an example bit allocation for an AID address, according to an embodiment. As illustrated, the AID address field 1300 spans 13 bits, numbered $B_0$ through $B_{12}$, in the illustrated embodiment. In an embodiment, bits $B_x$ through $B_{12}$ of the address field 1300 are allocated for a group index 1302, bits $B_6$ through $B_{x-1}$ are allocated for a block index 1304, bits $B_3$ through $B_5$ are allocated for a sub-block index 1306 of a sub-block within the block indicated by the bits $B_6$ through $B_{x-1}$, and bits $B_0$ through $B_2$ are allocated for a station (STA) index 1308 to identify the client station to which the AID 1300 is assigned. In the illustrated embodiment, allocation of bits $B_6$ through $B_{12}$ of the AID 1300 is divided between the group index 1302 and the block index 1304, with the number of bits allocated for each depending to the value of x. In some embodiments, the value of x, and accordingly the maximum number of client stations included in an address block, is fixed. In another embodiment, the value of x is dynamically adjustable based on the distribution of types of devices in a network, for example, or based on other system considerations. In an example embodiment, the value of x is adjustable within the range of 6 through 11. In an embodiment, the default value of x is set to 10, and the value of x is adjustable depending on device type distribution if more bits are needed to include more devices of a same type (e.g., sensors) in an address block, for example.

In some embodiments, different AID group index bits or bit combinations are reserved for particular types of devices within a network. For example, in an embodiment, one AID group index (e.g., 000) is reserved for offloading devices. Another AID index (e.g., 001), in an embodiment, is reserved for sensor devices with the network, for example. In some embodiments, non offloading client stations within a network are further subdivided into groups, for example a sensor device group and a non sensor low power device group, and a different AID address is reserved for each group. In an embodiment, an early portion of the data unit 700, such as the PHY preamble 601, the service field 610, or an early portion (e.g., first few bits) of the MAC header 614 of the data unit 700 includes the group index 1302 of the AID address assigned to the intended receiver of the data unit 700 to allow an un-intended receiver of the data unit 700 to filter out the data unit 700 is the un-intended receiver does not match the device type associated with the group index 1300.

Figure 14:
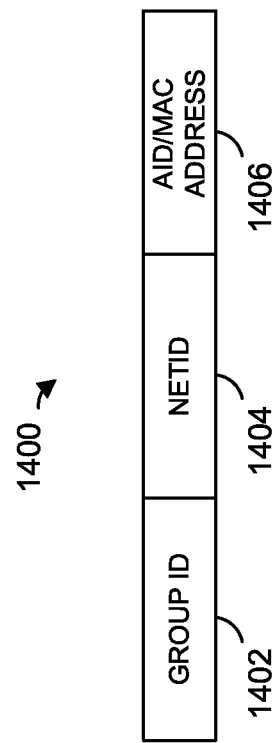
FIG. 14 is a diagram of an early receiver indication (ERI) field, according to an embodiment.

FIG. 14 is a diagram of an early receiver indication (ERI) field 1400 included in an early portion of the data unit 700, according to an embodiment. The ERI field 1400 includes a group index subfield 1402, a BSSID/NetID subfield 1404 and an AID/MAC address subfield 1406. In an embodiment, the number of bits in the NetID subfield 1404 and/or in the AID/MAC address subfield 1406 depends on the value of the Group ID subfield 1402. In other words, in this embodiment, the number of bits used to indicate the network ID and/or used to identify a particular station in the ERI field 1400 depends on the type of device or the type of traffic associated with the intended receiver of the data unit that includes the ERI field 1400. In some embodiments, the NetID subfield 1404 and/or the AID/MAC address subfield 1406 is entirely omitted from the ERI field 1400 for a certain value (or certain values) of the Group ID subfield 1402. For example, in a network that includes relatively few offloading client stations (and/or other non power constrained devices), higher order bits AID bits (e.g., bits $B_6$-$B_{12}$) of AID addresses assigned to such devices are generally set to logic zeros (0s), and, therefore, need not be included in the ERI field 1400. Accordingly, to reduce the number of bits of the ERI field 1400, higher order AID bits are omitted from the AID/MAC address subfield 1406 for non-power constrained devices as indicated by the Group ID subfield 1402, in some embodiments. As another example, if a network includes a large number of low power sensor devices, such as 6000 or more sensor devices in a "smart grid" arrangement, for example, then the number of bit in NetID subfield 1404 is omitted from the ERI field 1400 when the ERI field 1400 is included in a sensor data unit transmitted in the network because a conflict with In some embodiments, an AP (e.g., the AP 14) determines bit allocation for the BSSID subfield 1004 and the AID subfield 1006 based on the number of client stations associated with the AP, for example. In one such embodiment, for example, with a relatively low number of client stations associated with the AP, the AP allocates a greater number of bits to the BSSID subfield 1004, and fewer bits to the AID subfield 1006. On the other hand, in an embodiment in which a relatively large number of client stations 25 are associated with the AP 14, then the AP allocates a greater number of bits to the AID subfield 1006 and fewer bits to the BSSID subfield 1004. In an embodiment, the ERI field 1000 includes an additional subfield (e.g., a one bit AID/BSSID ratio subfield) used to indicate a particular bit allocation being utilized. Alternatively, in some embodiments, the ERI field 1000 includes a receiver MAC ID of the client station in place of the BSSID subfield 1004 and the AID subfield 906.

As an example, in an embodiment, the ERI field 1400 spans 11 bits.

The ERI field 1400 is included in the signal field 708 of the data unit 700, according to an embodiment. In another embodiment, the ERI field 1400 is included in the service field 510 of the data unit 700. In yet another embodiment, the ERI field 1400 is split between the signal field 708 and the service field 710.

In some embodiments and/or scenarios, for example when the data unit 700 is transmitted in a low bandwidth channel, such as a 1 MHz channel, the number of bits available in the signal field 708 and/or the service field 710 is smaller compared to the number of available bits in higher bandwidth data units. In an embodiment, to increase the number of bits in the service field 710 available for transmission of the ERI field 1400, the service field 710 includes a smaller scrambler seed relative to the scrambler seed size of a higher bandwidth data unit. For example, in an embodiment, the scrambler seed size is reduced to four bits or to six bits compared to a seven bit scrambler seed size used for higher bandwidth data unit. In such embodiments, the number of bits available for ERI bits is increased to 10 bits or 12 bits, for example. These bits are used to carry a portion of the ERI field 1400, with the remaining bits of the ERI field 1400 included in the signal field 710 (e.g., using reserved bits of the signal field 710), according to an embodiment.

In an embodiment, the long range communication protocol defines a control data unit format that omits a payload of a data portion from the data unit format. That is, in such embodiments, control data units are transmitted using non-data packet (NDP) format. FIGS. 15A-15E are diagrams of NDP control data units, according to some such embodiments. In various embodiments, the AP 14 is configured to transmit an NDP control data unit, such as, for example, one of the NDP control data units control data units illustrated in FIGS. 15A-15E, to the client station 25-1. In various embodiments, the client station 25-1 is also configured to transmit an NDP control data unit, such as, for example, one of the NDP control data units control data units illustrated in FIGS. 15A-15E, to the AP 14. Because NDP control data units omit a payload, such control data units reduce overhead associated with data transmission in at least some embodiments and/or scenarios. In an embodiment, NDP control data units are transmitted according to a lowest modulation and coding scheme defined by the long range communication protocol (and/or used in a particular network). In such embodiments, any device operating in a network is able to receive and interpret the control data units.

Figure 15A:
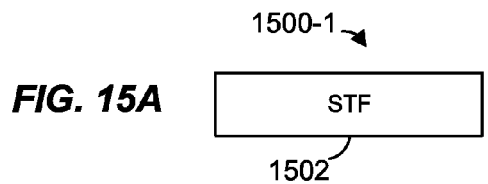
FIGS. 15A-15E are diagrams of non-data packet (NDP) control data units, according to several embodiments.
Figure 15B:
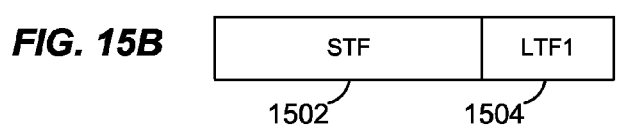
Figure 15C:
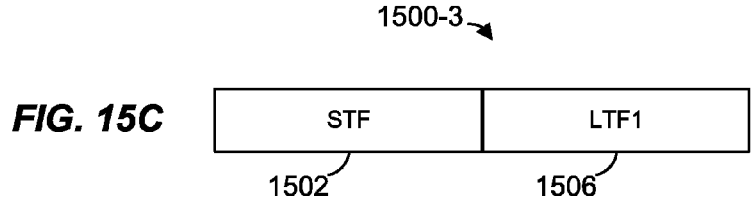
Figure 15D:
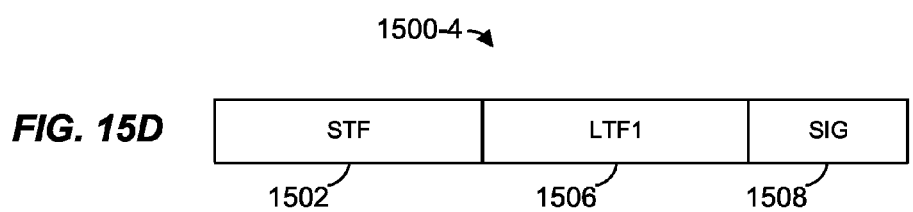
Figure 15E:
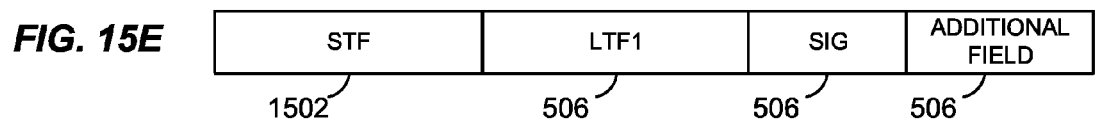

FIG. 15A is a diagram of an NDP control data unit 1500-1. The NDP control data unit 1500-1 includes an STF field 1502, and omits the remaining portions of a regular data unit format, in an embodiment. In an embodiment, the STF field 1502 spans two OFDM symbols. FIG. 15B is a diagram of an NDP control data unit 1500-2, according to an embodiment. The NDP control data unit 1500-2 is similar to the NDP control data unit 15A except that the control data unit 1500-2 includes an LTF field 1504 in addition to the STF field 1502 included in the control data unit 1500-1. In an embodiment, the LTF field 1504 spans one OFDM symbol. FIG. 15C is a diagram of a control data unit 1500-3, according to an embodiment. The control data unit 1500-3 is similar to the control data unit 1500-2 of FIG. 15B, except that the control data unit 1500-3 includes a longer LTF field 1506. In an embodiment, the LTF field 1506 spans two OFDM symbols, for example. FIG. 15D is a diagram of a control data unit 1500-4, according to an embodiment. The control data unit 1500-4 is similar to the control data unit 1500-3 except that the control data unit 1500-4 includes a signal field 1508 in addition to the STF field 1502 and the LTF field 1506. The signal field 1508 carries certain information related to the control data unit 1500-4, for example an address of the device that generated the control data unit 1500-4, the device that is the intended receiver of the control data unit 1500-4, etc. In an example embodiment, the signal field 1508 spans two OFDM symbol. In another example embodiment, the signal field 1508 spans four OFDM symbols. FIG. 15E is a diagram of a control data unit 1500-5, according to an embodiment. The control data unit 1500-5 is similar to the control data unit 1500-4 of FIG. 15D, except that the control data unit 1500-5 includes an additional field 1510. Addition of the field 1510 gives a PHY processing unit (e.g., the PHY processing unit 29) receiving the control data unit 1500-5 extra time to determine that the control data unit 1500-5 is an NDP control data unit, and to process the control data unit 1500-5 accordingly. In an example embodiment, the additional field 1510 includes a second LTF field (LTF2), for example. In another embodiment, the additional field 1510 includes a fixed length "dummy" data field. As yet another embodiment the additional field 1510 is replaced by a signal extension field, similar to a signal extension field defined by the IEEE-802.11n Standard, for example. In some embodiments, the additional field 1510 is optional an is omitted from the control data unit 1500-5 in some situations.

In some embodiments, single stream (SS) short control data units, such as, for example the control data unit 1500-1, the control data unit 1500-2 and/or the control data unit 1500-3 includes an indication that the control data unit is an SS-NDP control data unit. For example, in an embodiment, a pattern of one or more fields included in the SS-NDP data unit (e.g., an STF field pattern, an LTF field pattern, SIG field pattern, etc.), is different from a corresponding pattern of a regular (non-NDP) data unit. In another embodiment, a signal field of an SS-NDP control data unit includes an explicit indication, such as a one-bit indication, that allows a receiving device to recognize the SS-NDP control data unit as an SS-NDP control data unit.

According to an embodiment, a PHY processing unit (e.g., the PHY processing unit 20 and/or the PHY processing unit 29) generally receives a data unit, processes at least a PHY portion, such as a PHY preamble of the data unit, and provides to a MAC processing unit (e.g., the MAC processing unit 18 and/or the MAC processing unit 28) certain timing information related to the PHY portion of the data unit. For example, in an embodiment, the PHY processing unit issues an PHY-RXSTART indication primitive to the MAC processing unit in response to processing and verifying correctness of a signal field of the received data unit. Then, after receiving the last octet of the data unit, the PHY processing unit issues an PHY-RXEND indication primitive to the MAC processing unit informing the MAC processing unit that the entire data unit or data unit is received.

When receiving a short control data unit (e.g., an SS-NDP control data unit), however, a PHY processing unit is unable to determine that the short control data unit is an NDP data unit until the signal field of the data unit is received and verified by the PHY processing unit, in some at least embodiments. Accordingly, in some such embodiments, the PHY processing unit issues a PHY-RXEND indication primitive and a PHY-CCA indication primitive to a MAC processing unit at a substantially the same time as the PHY-RXSTART indication primitive. When the MAC processing unit receives such substantially simultaneous primitives, the MAC processing unit adjust the timing of the PHY-RXEND indication primitive to correspond with the boundary of the end of the control data unit, according to an embodiment. Alternatively, in another embodiment, the PHY processing unit issues a PHY-RXEND indication primitive at the boundary of one or more symbols after the end of the control data unit. In this case, the PHY processing unit issues a PHY-TXEND confirmation primitive to the MAC processing unit at the boundary of the one or more symbols after the end of the short control data unit.

Figure 16:
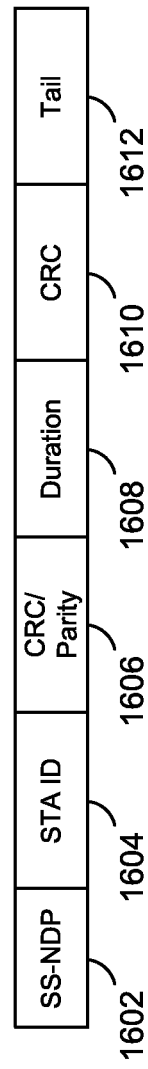
FIG. 16 is a diagram of a signal field of a control data unit, according to an embodiment.

FIG. 16 is a diagram of a signal field 1600 included in a control data unit, according to an embodiment. In an embodiment, the control data unit 1600 is formatted according to an SS-NDP data unit format. The signal field 1600 includes an SS-NDP indication subfield 1602, a station ID field 1604, a CRC/parity subfield 1606, a duration subfield 1608, a second CRC subfield 1610 and a tail bit subfield 1612. The SS-NDP subfield is a one bit field used to indicate that the data unit that includes the signal field 1600 is an SS-NDP data unit. In some embodiments, SS-NDP data units are identified by indications different than an SS-NDP bit in a signal field of the data unit, for example by a modulation of a field of an SS-NDP data unit that is different than a modulation of a corresponding field in a regular data unit. In some such embodiments, the SS-NDP subfield 1602 is omitted from the signal field 1600. The STA ID subfield 1604 includes an address identifying the intended receiving device of the data unit that includes the signal field 1600, in some embodiments. For example, in an embodiment, the STA ID subfield 1604 includes a partial MAC address of the intended receiving device. As another example, in another embodiment, the STA-ID subfield 1604 includes an AID address or a partial AID address of the intended receiving device. Additionally or alternatively, in an embodiment, the STA ID subfield 1604 includes a network ID (such as BSSID) of the network in which the data unit that includes the signal field 1600 is originated. In some embodiments, the STA ID subfield 1604 includes a hash value generated, for example based on the AID and the network id associated with the control data unit is being transmitted.

With continued reference to FIG. 16, in an embodiment, the first parity bit or CRC field 1606 allows a receiving device to check the correctness of a first portion of the signal field, such as the SS-NDP subfield 1602 and the STA-ID subfield 1604, according to an embodiment. In an embodiment, a PHY processing unit of a receiving device checks the correctness of the first portion of the signal field and issues a primitive, such as an RXSTART indication, to a MAC processing unit before reaching the end of the signal field 1600. The duration subfield is set to a duration of the transmission sequence of which the control data unit that includes the signal field 1600 is a part. The CRC field 1610 is used by the receiving device to check the correctness of the entire received signal field 1600, in an embodiment. The single field 1600 also includes tail bits in a field 1612 at the end of the signal field 1600. In some embodiments, for example in embodiments in which an early indication is used to allow a receiving device to determine that the control data unit is an SS-NDP control data unit, tail bits are not needed in the signal field 1600 and can be used to carry useful information , for example. Further, in some such embodiments, the signal field 1600 is "extended"

beyond the signal field length of a regular data unit, for example, if additional bits are needed to carry useful information in the signal field 1600.

FIG. 17 is a diagram of a signal field 1700 included in a control data unit, according to an embodiment. In various embodiments and/or scenarios, the control data unit that includes the signal field 1700 is an acknowledgement data unit, a request to send (RTS) data unit, a clear to send (CTS) data unit, an CTS-to-Self data unit, for example, or a control data unit of another type. The signal field 1700 includes a type subfield 1702, an ID subfield 1704, a more data (MD) subfield 1706, a bandwidth (BW) subfield 1710, a CRC subfield 1710 and a tail bit subfield 1712. The type subfield 1702 used to indicate the control data unit type (e.g., ACK data unit, RTS data unit, CTS data unit, etc.), according to an embodiment. In various embodiments and/or scenarios, the ID subfield 1704 includes a full or a partial AID, or a MAC address of the intended receiving device. The BW subfield 1710 is used to indicate the channel bandwidth used to transmit the control data unit. In some embodiments, for example in a control data unit transmitted using the smallest bandwidth (e.g. 1 MHz) used in a network in which the control data unit is being transmitted (e.g., the network 10), the BW subfield 1710 is omitted from the signal field 1700.

Figure 18:
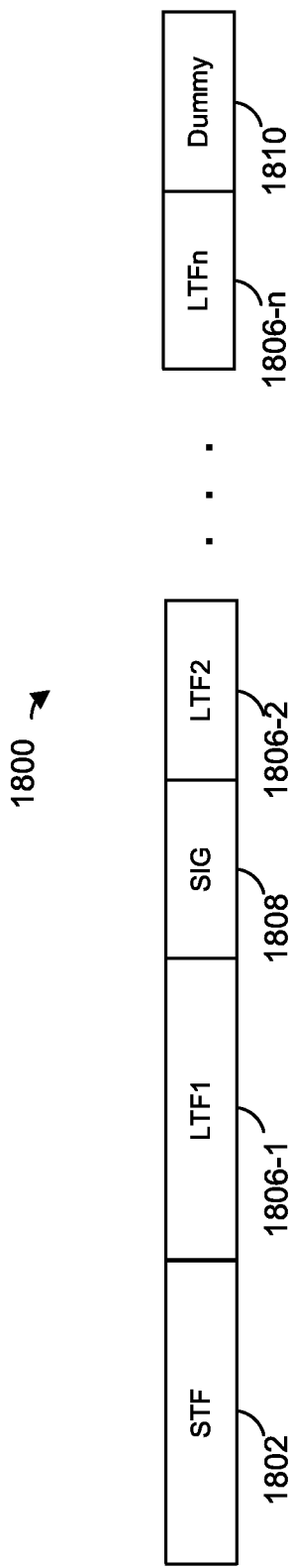
FIG. 18 is a diagram of an NDP control data unit, according to another embodiment.

FIG. 18 is a diagram of an NDP control data unit 1800, according to another embodiment. Control data unit 1800 is similar to the control data unit 1500-5 of FIG. 15E except that the control data unit 1800 is a multi-stream data unit and, accordingly, includes additional LTFs 1806. In an embodiment, the control data unit 1800 is formatted according to an NDP format used for sounding packets, where the additional LTFs are used to train additional dimensions of the communication channel between the transmitting and the receiving devices.

Figure 19A:
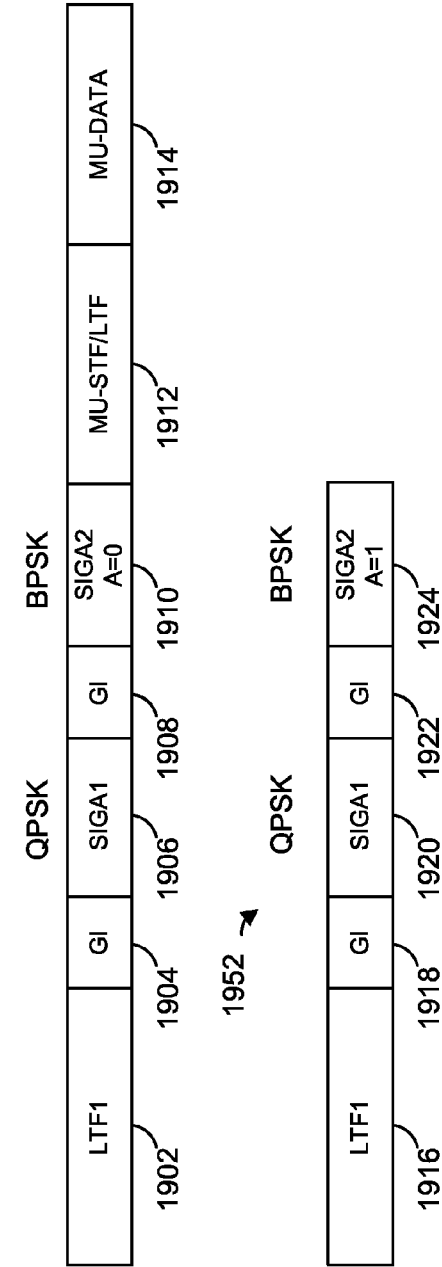
FIGS. 19A-19B are diagrams illustrating various techniques used by a receiving device to determine whether a received data unit is a regular data unit or a short control data unit, according to several embodiments.
Figure 19B:
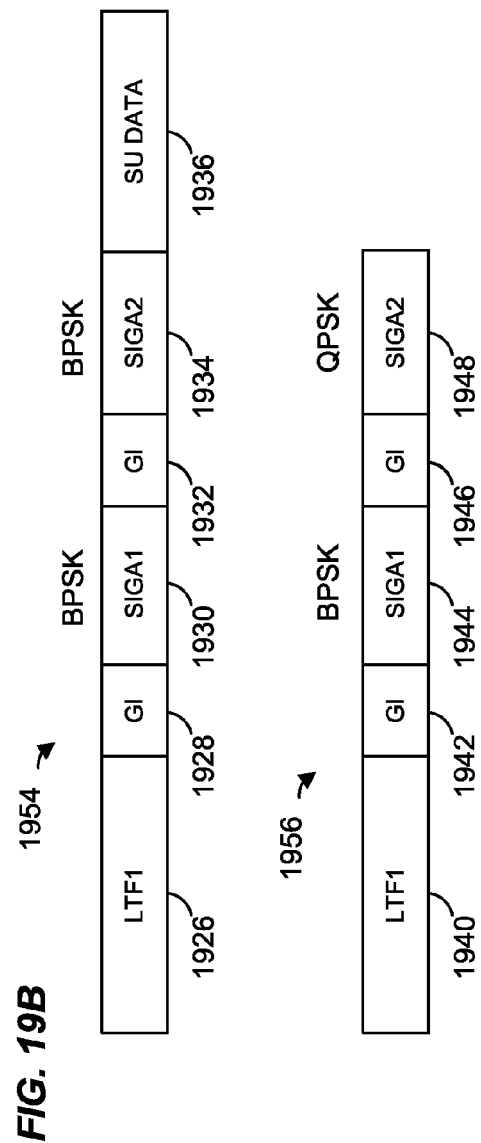

FIGS. 19A-19B are diagrams illustrating various techniques used by a receiving device to determine whether a received data unit is a regular data unit or a short control data unit, according to several embodiments. Referring to FIG. 19A, an MU data unit 1950 includes an aggregation bit in a signal field 1910. The aggregation bit is set to the value of logic 0 to indicated that the data unit 1950 is an MU data unit, according to an embodiment. In an embodiment, an aggregation bit in a signal field 1924 of a control data unit 1952 is set to a logic 0 to indicate that the data unit 1952 is a control data unit. Referring now to FIG. 19B, a receiving device determines whether a received data unit is a control data unit or a regular data unit based on modulation of a signal field of the data unit. To this end, a second signal field 1934 of a single user data unit 1954 is modulated using BPSK modulation, while a corresponding signal field 1948 of a control data unit 1956 is modulated using QPSK modulation.

In order to allow a device receiving a control data unit, such as an ACK data unit or a CTS data unit, to ensure that the control data unit was transited in response to a particular data unit (e.g., the data unit for which the device is expecting a response, or a request to send (RTS) data unit), in some embodiments, a short control data unit (e.g., a single stream non data packet (SS-NDP) control data unit) includes identification of the data unit in response to which the control data unit is being transmitted. For example, in an embodiment, an ACK data unit includes an indication of the data unit being acknowledged by the ACK data unit and/or an indication of the device that transmits the ACK data unit. As another example, in an embodiment, a CTS data unit includes an indication of the RTS data unit in response to which the DTS data unit is being transmitted. In some such embodiments, a control data unit includes a partial or a full address (or ID) of the device that transmits the control data unit. In another embodiment, the control data unit includes a hashed value calculated from portions of the address (or ID) of the device that transmits the control data unit. Alternatively, in another embodiment, the control data unit includes the frame check sequence (FCS) or a partial FCS (e.g., the last 4 bits of the FCS, the last 8 bits of the FCS, etc.) of the data unit in repose to which the control data unit is being sent. Additionally, in some embodiments, a control data unit is transmitted using the same PHY mode as the PHY mode that was used to transmit the data unit in response to which the control data unit is being sent.

In some situations, control data units are used for frame exchange protection. For example, prior to transmitting a regular data unit, a device transmits a control data unit, such as a RTS data unit and, in response to the RTS data unit, receives a CTS data unit from the intended receiver of the data unit. Such control frames are used by non-intended receivers of the data unit to determine that the medium will be unavailable for a certain period of time indicated by the control data units. Such control data units are used to set the network allocation vector (NAV) of the non-intended receivers in the vicinity of the transmitting device. In some embodiments, in order to allow all receiving devices in the communication range of a transmitting device to receive and properly interpret a control data unit, a transmitting device chooses a base channel bandwidth for transmitting the control data unit. For example, in an embodiment and/or scenario, the base channel bandwidth corresponds to a smallest bandwidth receiving device in the network (e.g., 1 MHz BW). The control data unit is then duplicated one or more times to cover all channels used by devices in the network to allow all devices to properly set the network allocation vector and to thereby properly protect the medium from transmissions by devices not involved in the current frame exchange.

To this end, an AP (e.g., the AP 14) is configured to operate in one or more duplicated modes used for control data unit transmission, in various embodiments and/or scenarios. For example, in an embodiment, the AP is configured to operate in a 2 MHz duplicated control data unit mode. When operating in the 2 MHz duplicated control data unit mode, the AP generates a control data units for transmission in a 2 MHz bandwidth channel, and then duplicates the generated data unit for transmission in all channels used for communication by the AP, e.g., in a 4 MHz band, in an 8 MHz band, and a 16 MHz band, for example. Similarly, in a 1 MHz duplicated control data unit mode, the AP generates a control data units for transmission in a 1 MHz bandwidth channel, and then duplicates the generated data unit for transmission in all channels used for communication by the AP, e.g., in a 2 MHz band, in an 4 MHz band, and a 8 MHz band, or a 16 MHz band, for example.

In some embodiments, the particular base channel and the particular duplicated mode is determined or chosen by the transmitting device based on channel conditions e.g., based on the packet error rate (PER), associated with the communication channel between the transmitting and the receiving device (or devices). For example, in an embodiment, a higher degree of protection is desired when a communication channel with poor channel conditions (or high PER) is being utilized. Conversely, a better quality communication channel (or a channel associated with a lower PER) requires less protection or no protection, in an embodiment. Accordingly, in an embodiment, a transmitting device chooses a lower bandwidth base channel for a channel associated with poor conditions to achieve a higher degree of protection for the channel. For suitably good channel conditions, a transmitting device chooses to not send an RTS data unit or a CTS to self data unit, in one embodiment and/or scenario. In an embodiment and/or scenario, a transmitting device chooses to send an RTS or a CTS to self data unit at a base bandwidth of 1 MHZ for relatively poor channel conditions or at a base channel of 2 MHz for relatively good channel conditions. In either case, the 1 MHz or the 2 MHz control data unit is duplicated one or more times such that the control data unit is transmitted in a total bandwidth (e.g., 4 MHz, 8 MHz, 16 MHz, etc.) utilized in the communication network, in an embodiment.

Alternatively, in another embodiment, a client station sends an RTS data unit to an AP using a certain bandwidth (e.g., a 2 MHz bandwidth), and requests the AP to transmit a CTS data unit at a smaller base bandwidth (e.g., at 1 MHz base bandwidth) to achieve suitable protection. In this case, the AP chooses the requested smaller bandwidth for transmitting the CTS data unit. In another embodiment, a transmitting device chooses a base bandwidth fort transmitting a CTS data unit to be the same as the bandwidth that was used to transmit the corresponding RTS data unit. In any event, the CTS data unit is duplicated one or more times to cover a desired total bandwidth, e.g. the total bandwidth used in a network, in some embodiments and/or scenarios.

Transmissions from the AP 14 and/or from a client station 25 are protected by a carrier sense multiple access with collision avoidance (CSMA/CA) procedure, such as the procedure discussed above with respect to FIG. 2. In an embodiment, CSMA/CA is used to manage access to the medium shared by the AP14 and the client stations 25 to avoid collisions between transmission by the AP and the various client stations. In order to avoid a collision, a client station 25 or the AP 14 conducts a carrier sensing procedure to detect any current transmissions in the medium, and delays transmission by at least the duration of the currently present transmission. To allow a client station 25 and/or the AP14 to determine the period of time during which the transmitting device should not transmit, transmitted data units typically include an indication of a duration or a length of the data unit, for example in the signal field 708 of the data unit 700.

Figure 20:
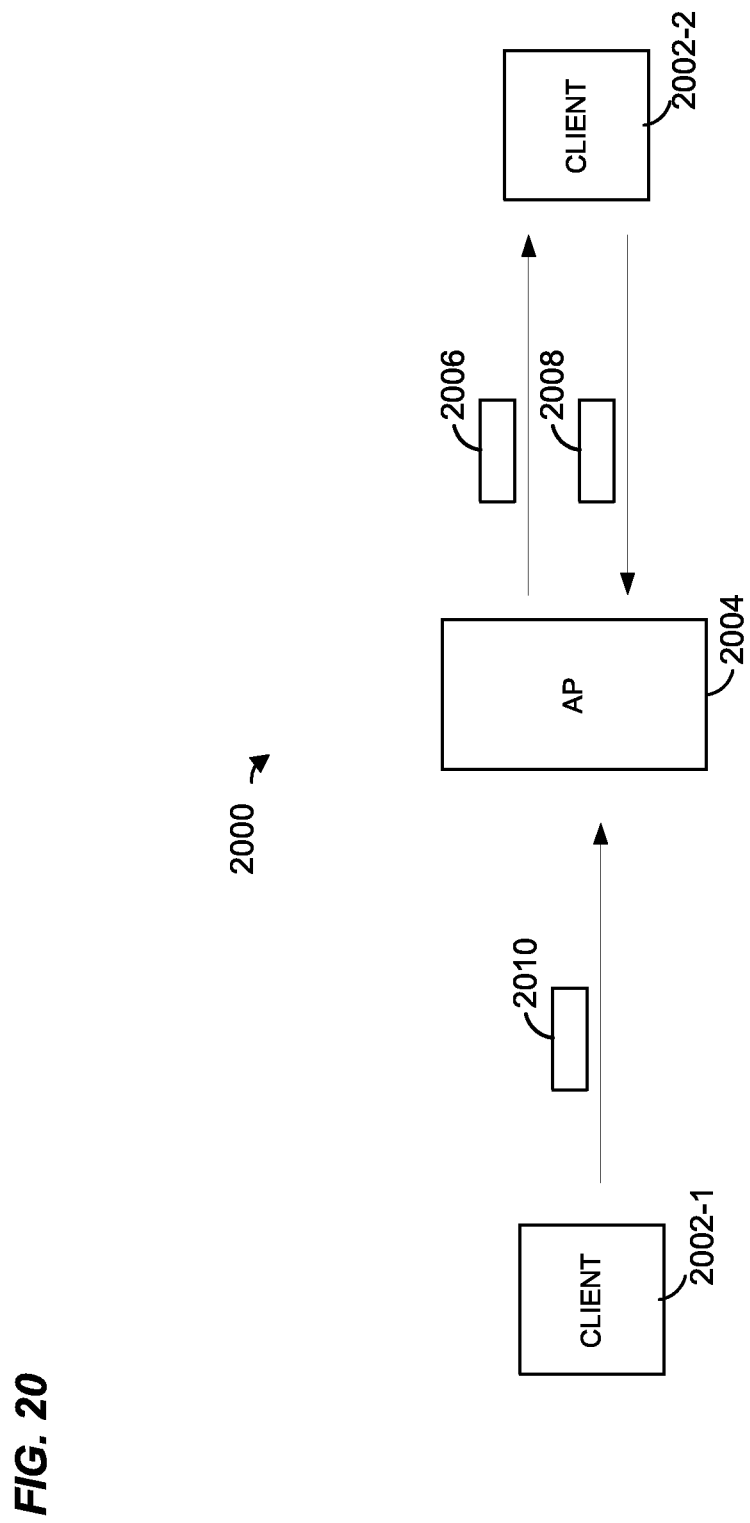
FIG. 20 is a diagram illustrating an example arrangement in which a client station is a hidden node with respect to another client station, according to an embodiment.

FIG. 20 is a diagram illustrating an example arrangement 2000 in which a client station 2002-1 is a hidden node with respect to a client station 2002-2 (and vice versa), according to an embodiment. Each of the client stations 2002 is within the communication range of an AP 2004, but is not within the communication range of the other client station 2002. The AP 2004 transmits a data unit 2006 to the client station 2006-2. Because the client station 2006-1 is within communication range of the AP 2004, the client station 2006-1 is able to detect the data unit 2006, determine that the client station 2006-1 is not an intended recipient of the data unit 2006, for example based on certain information included in a signal field included in the data unit 2006, and discard the data unit 2006 without processing the remaining fields of the data unit 2006. Prior to discarding the data unit 2006, the client station 2002-1 determines the duration of the data unit 2006, for example from a duration indication also included in a PHY preamble of the data unit 2006. Accordingly, the client station 2002-1 delays transmission to the AP 2004, at least until for the duration of the data unit 2006. The client station 2006-2, upon successful reception of the data unit 2006, transmits an acknowledgement (ACK) data unit 2008 to the AP 2004. Because the client station 2006-1 is outside of the communication range of the client station 606-2, the client station 2006-1 does not detect the ACK data unit 2008, and initiates transmission of the data unit 2010 to the AP2004 concurrently with the at least a portion of the ACK data unit 2008, resulting in a collision between the data unit 2010 and the ACK data unit 2008 at the AP 2004. That is, the ACK data unit 2008 is not protected from transmissions by the client station 2002-1 in such situations.

In embodiments described below, such hidden node collisions are avoided by including in the signal field of the data unit 2006 information that the client station 2002-1 determine or calculate the duration of a transmission sequence associated with the transmission of the data unit 2006.

Figure 21:
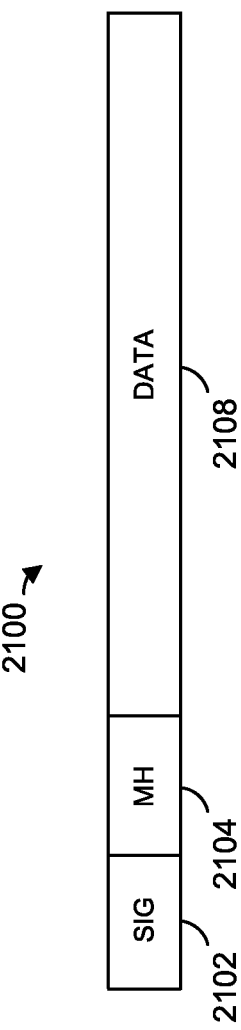
FIG. 21 is a diagram of a data unit that includes an acknowledgement data unit indication, according to an embodiment.

FIG. 21 is a diagram of a data unit 2100 that includes an acknowledgement data unit indication in a PHY preamble of the data unit, according to an embodiment. In an embodiment, the data unit 2102 is the same as or similar to the data unit 700 of FIG. 7. The data unit 2100 includes a signal field 2102, a MAC header 2104 and a data portion 2108. The signal field 2102 includes an indication informing a receiving device whether an acknowledgment data unit is expected to be transmitted by a receiver of the data unit 2100. In some embodiments, ACK indication is also used to indicate a type of the expected ACK response. For example, ACK data unit indication occupies two bits of the signal field 2102, in an embodiment, with the two bits set to 00 to indicate a regular ACK data unit, 01 to indicate a block ACK (BA) data unit, and 10 to indicate that no acknowledgment is expected, for example. The combination of 11 for ACK indication bits is reserved, in some embodiments. In an embodiment, the combination 11 is used to indicate that the data unit 2100 is a broadcast data unit. In some such embodiments, the signal field 2102 is interpreted differently when ACK indication bits are set to 11 compared to when ACK indication bits are set on the other values. For example, signal field bits that are typically not used to carry useful information in broadcast data units (e.g., signal field bits that are always set to 0 in a broadcast data unit, e.g. a beamforming bit) are used to carry certain information regarding the broadcast data unit. For example, one bit is used to indicate a certain type of a broadcasting data unit, such as a beacon or a short beacon data unit, a probe/service response data unit, a short ACK/NDP data unit, etc.

Figure 22:
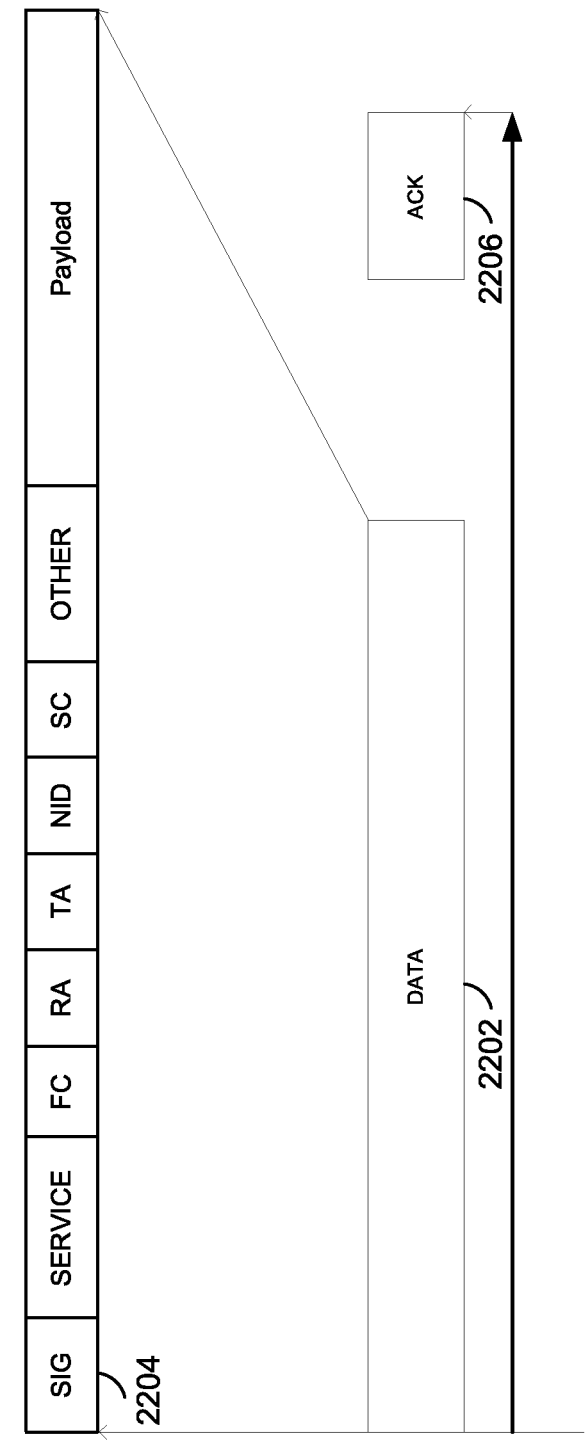
FIG. 22 is a diagram of a single exchange protection scheme, according an embodiment.

FIG. 22 is a diagram of a single exchange protection scheme 2200, according an embodiment. A transmitting device (e.g., the AP14) transmits a data unit 2202 and includes an indication in a signal field 2204 that an ACK data unit 2206 is expected to follow the reception of the data unit 2204. A receiving device (e.g., the client station 25-1) that is not an intended receiver of the data unit 200 determines that the ACK data unit 2206 is expected. The receiving device determines a duration of a frame exchange sequence that includes transmission of the ACK data unit 2206 and delays channel access until the end of the duration.

Figure 23:
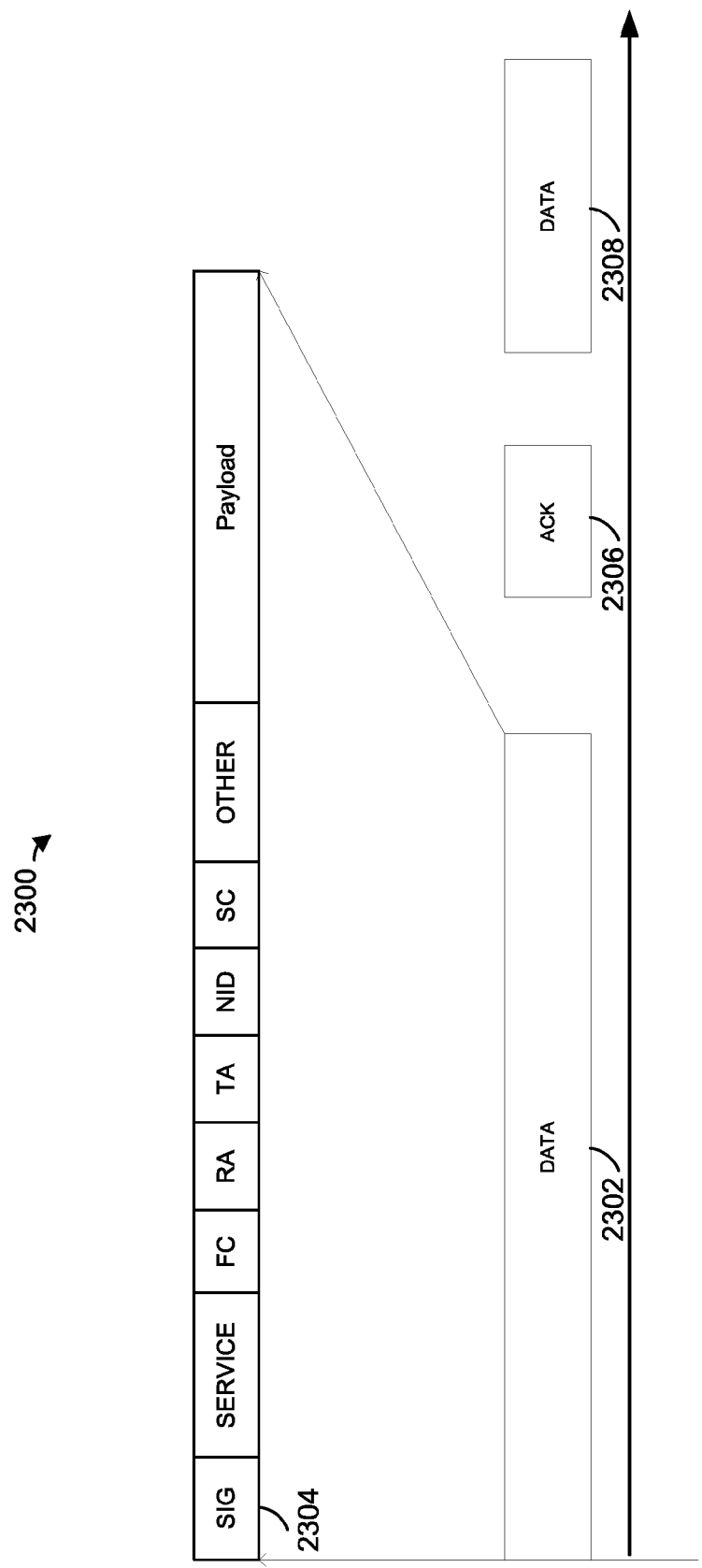
FIG. 23 is a diagram of a multi-exchange protection scheme, according to an embodiment.

FIG. 23 is a diagram of a multi-exchange protection scheme 2300, according to an embodiment. A transmitting device (e.g., the AP14) transmits a data unit 2302 and includes an indication in a signal field 2304 that an ACK data unit 2306 is expected to follow the reception of the data unit 2304. The multi-exchange protection scheme 2300 is similar to the single exchange protection scheme 2200 except that the scheme 2300 also includes indicating whether additional data is expected to be transmitted after the acknowledgement data unit 2306. To this end, the signal field 2304 of the data unit 2300 also includes a more data (MD) indication (e.g., one bit) used to inform an unintended receiver of the data unit 2302 that a data unit 2308 will be transmitted after reception of the ACK data unit 2306. In an embodiment, the intended receiver of the data unit 2300 includes a corresponding MD indication in the ACK data unit 2306 inform devices in the range of the receiving device that the medium should be reserved for a duration that includes the transmission of the data unit 2308.

FIG. 24 is a diagram of a prior art data unit 2400 that includes a cryptography information header (or a security header) 2402. The security header 2402 includes a packet number that spans six octets of the header 2402 (PN0-PN5) 2404, and extension IV field 2408 a Key ID field 2410, and reserved fields 2406. The data unit 2400 also includes an eight octet message integrity code (MIC) field 2412.

In some embodiments, a cryptography information header (sometimes referred to herein as a security header) and/or an MIC field specified by the long range communication protocol is shorter compared to the corresponding fields in the data unit 2400. For example, in an embodiment, the long range communication protocol specifies a four byte security header that includes a packet number spanning the four bytes. In some embodiments, a MIC field of an encrypted long range data unit spans only four bytes (compared to the eight byte MIC field 2412 of the data unit 2400), at least in data units of a relatively small size and/or in data units requiring a relatively low security level. In an embodiment, a KeyID for a long range data unit is included in a MAC header of the data unit.

In another embodiment, a security header used for a long range data unit is further compressed to a two byte length. In some embodiments, a two byte security header includes a two byte packet number (e.g., PN2 and PN3 in FIG. 24), for example. In one embodiment, a sequence control field of a MAC header of the data unit is used as the packet numbers PN0 and PN1.

In an embodiment, when a data unit is encrypted, to ensure generate a unique nonce value for encryption of a data unit, a nonce for the data unit is constructed using the NetID address included in the MAC header of the data unit. In another embodiment, a nonce for a data unit includes a ToAP/FromAP flag included in a MAC header or a PHY preamble of the data unit to indicate whether the data unit is transmitted from an AP. In another embodiment, a nonce block for a data unit includes a MAC address of the intended receiver of the data unit.

Figure 25:
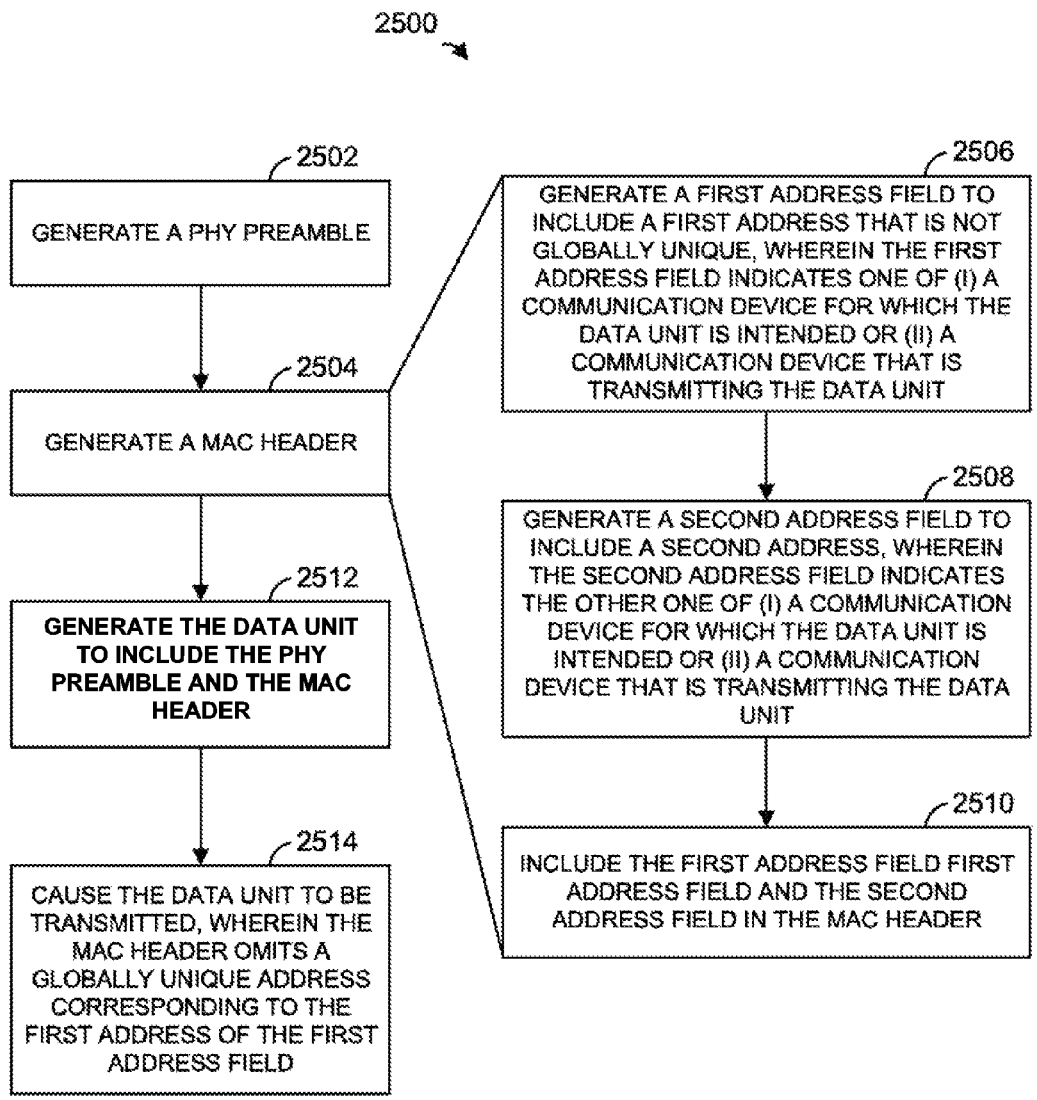
FIG. 25 is a flow diagram of an example method, according to an embodiment.

FIG. 25 is a flow diagram of an example method 2500, according to an embodiment. With reference to FIG. 1, the method 2500 is implemented by the network interface 16, in an embodiment. For example, in one such embodiment, the PHY processing unit 20 is configured to implement the method 2500. According to another embodiment, the MAC processing 18 is also configured to implement at least a part of the method 2500. With continued reference to FIG. 1, in yet another embodiment, the method 2500 is implemented by the network interface 27 (e.g., the PHY processing unit 29 and/or the MAC processing unit 28). In other embodiments, the method 2500 is implemented by other suitable network interfaces.

At block 2502, a PHY preamble is generate. In an embodiment, the PHY preamble 701 of the data unit 700 (FIG. 7) is generated. In another embodiment, a different PHY preamble is generated. At block 2504, a MAC header is generated. Block 2504 includes blocks 2506-2510. A first address field to be included in the MAC header is generated at block 2506. The first MAC address field indicates one of i) a communication device for which the data unit is intended or ii) a communication device that is transmitting the data unit. The first address field includes an address that is not globally unique. In an embodiment, the first address field is a shortened field that includes a local address that is shorter than the global MAC address associated with the device. In some embodiments, the first address field generated at block 2506 includes a shortened RA or a shortened TA described above with respect to FIG. 7B. As an example, in an embodiment, the first address field generated at block 2506 includes an AID address having bit allocation as discussed above with respect to FIG. 13.

At block 2508, a second address field to be included in the MAC header is generated. The second address field indicates the other one of i) a communication device for which the data unit is intended or ii) a communication device that is transmitting the data unit. In an embodiment, the second address field includes a shortened, non-global address, similar to the address included in the first address field generated at block 2506. In another embodiment, the second address field includes a global MAC address associated with the device.

At block 2510, the field address field generated at block 2506 and the second address field generated at block 2508 are included in the MAC header generated at block 2504. At block 2512, the data unit is generated. In an embodiment, the data unit 700 of FIG. 7A is generated. In another embodiment, a different data unit is generated. The data unit generated at block 2512 includes the PHY preamble generated at block 2502 and the MAC header generated at block 2512. The data unit generated at block 2512 omits a globally unique address corresponding to the first address included in the first address field. Accordingly, because the data unit generated at block 2512 includes a shortened, non-global address in the first address field generated at block 2506, the MAC header of the data unit is generally shorter and causes less overhead compared to a MAC header formatted according to the current IEEE 802.11 Standard. At block 2514, the data unit generated at block 2512 is caused to be transmitted.

Figure 26:
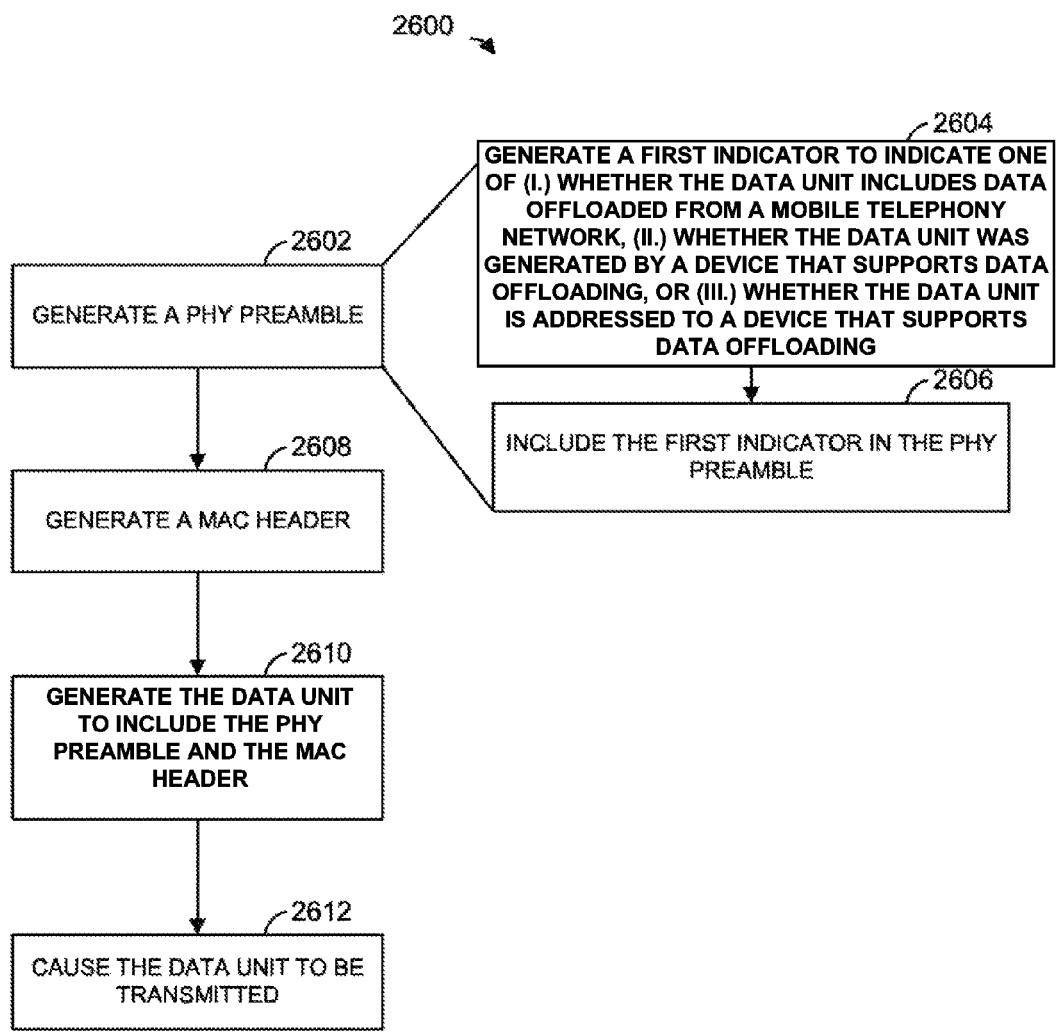
FIG. 26 is a flow diagram of an example method, according to an embodiment.

FIG. 26 is a flow diagram of an example method 2600, according to an embodiment. With reference to FIG. 1, the method 2600 is implemented by the network interface 16, in an embodiment. For example, in one such embodiment, the PHY processing unit 20 is configured to implement the method 2600. According to another embodiment, the MAC processing 18 is also configured to implement at least a part of the method 2600. With continued reference to FIG. 1, in yet another embodiment, the method 2600 is implemented by the network interface 27 (e.g., the PHY processing unit 29 and/or the MAC processing unit 28). In other embodiments, the method 2600 is implemented by other suitable network interfaces.

At block 2602, a PHY preamble of a data unit is generated. In an embodiment, the PHY preamble 701 of the data unit 700 (FIG. 7) is generated. In another embodiment, a different PHY preamble is generated. Generating PHY preamble at block 2602 includes blocks 2604 and 2606. At block 2604, a first indicator is generated. In an embodiment, the first indicator indicates whether the data unit includes data offloaded from a mobile telephony network separate from the network in which the device generating the data unit is operating. In another embodiment, the first indicator indicates whether the data unit was generated by a device that supports offloading of data from a mobile telephony network separate from the network device in which the data unit is transmitted. In yet another embodiment, the first indicator indicates whether the data unit is addressed to a device that supports offloading of data from a mobile telephony network separate from the network in which the data unit is being transmitted. In one embodiment, the first indicator is included in an address field that includes at least a partial address of the intended receiver of the data unit, such as, for example, a partial AID discussed above with respect to FIG. 13.

At block 2608, a MAC header of the data unit is generated. In an embodiment, the MAC header 750 of FIG. 7B is generated. In another embodiment, a different MAC header is generated. At block 2610, the data unit is generated. The data unit generated at block 2610 includes the PHY preamble generated at block 2602 and the MAC header generated at block 2602. In an embodiment, the first indicator generated at block 2604 allows a non offloading device, such as, for example, a low power sensor device, to determine based on the PHY preamble generated at block 2602 that the device is not an intended recipient of the data unit and to discard the data unit to save power, for example. At block 2612, the data unit generated at block 2610 is caused to be transmitted.

Figure 27:
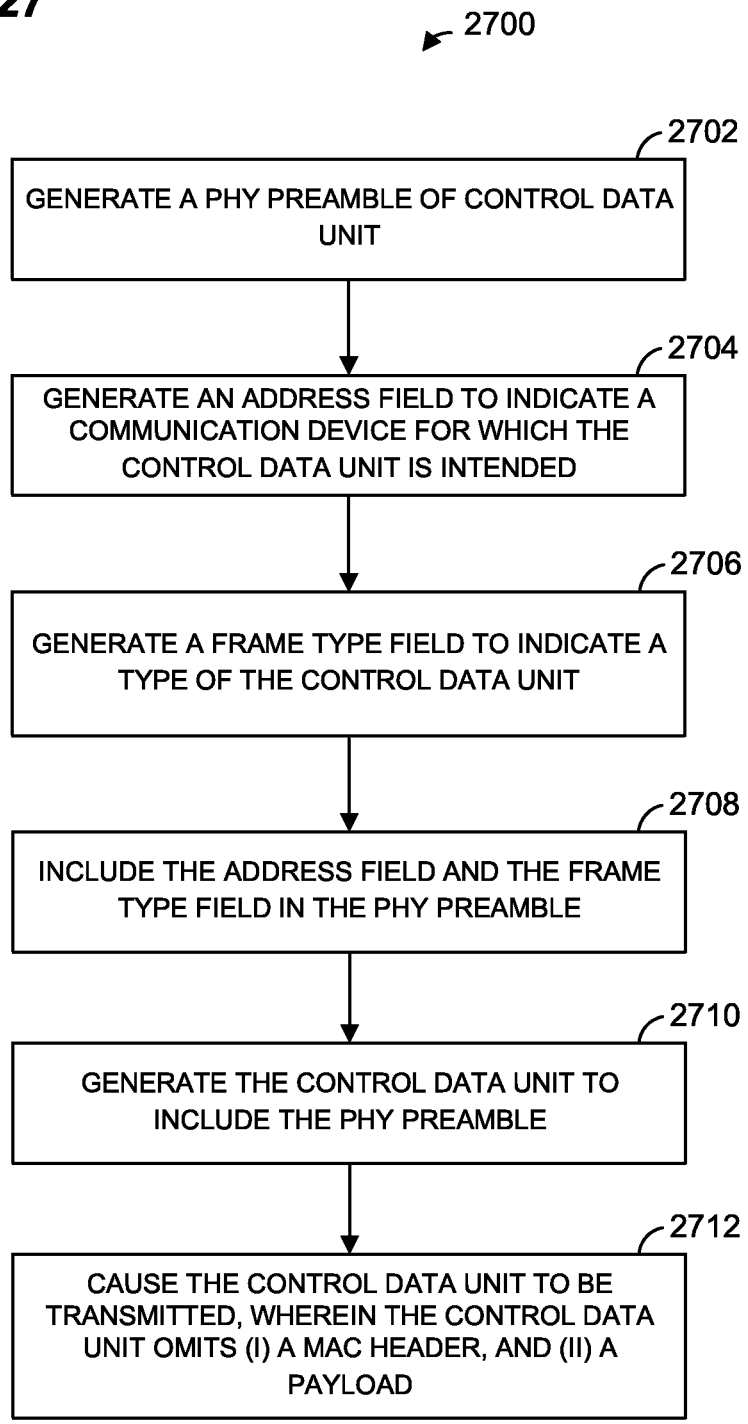
FIG. 27 is a flow diagram of an example method for generating a control data unit, according to an embodiment.

FIG. 27 is a flow diagram of an example method 2700 for generating a control data unit, according to an embodiment. With reference to FIG. 1, the method 2700 is implemented by the network interface 16, in an embodiment. For example, in one such embodiment, the PHY processing unit 20 is configured to implement the method 2700. According to another embodiment, the MAC processing 18 is also configured to implement at least a part of the method 2700. With continued reference to FIG. 1, in yet another embodiment, the method 2700 is implemented by the network interface 27 (e.g., the PHY processing unit 29 and/or the MAC processing unit 28). In other embodiments, the method 2700 is implemented by other suitable network interfaces.

At block 2702, a PHY preamble to be included in the control data unit is generated. At block 2704, an address field is generated. The address field indicates a communication device for which the control data unit is generated. For example, in one embodiment, a partial AID field is generated to include a partial AID associated with the intended recipient of the control data. As another example, in another embodiment, the address field is generated to include a full AID or a full MAC address of the intended recipient. In an embodiment, the ID field 1704 of FIG. 17 is generated. In another embodiment, a different address field is generated.

At block 2706, a frame type field is generated. The frame type field indicates a type of the control data unit (e.g., acknowledgement, RTC, CTC, etc.). In an embodiment, the frame type field 1702 of FIG. 17 is generated. In another embodiment, a different frame type field is generated.

At block 2708, the address field generated at block 2704 and the frame type field generated at block 2708 is included in the PHY preamble generated at block 2702. At block 2710, the control data unit is generated. In an embodiment, the control data unit 1700 of FIG. 17 is generated. In another embodiment, a different control data unit is generated. The control data unit includes the PHY preamble generated at block 2702 and omits a MAC header and a payload. At block 2712, the control data unit generated at block 2701 is caused to be transmitted.

Figure 28:
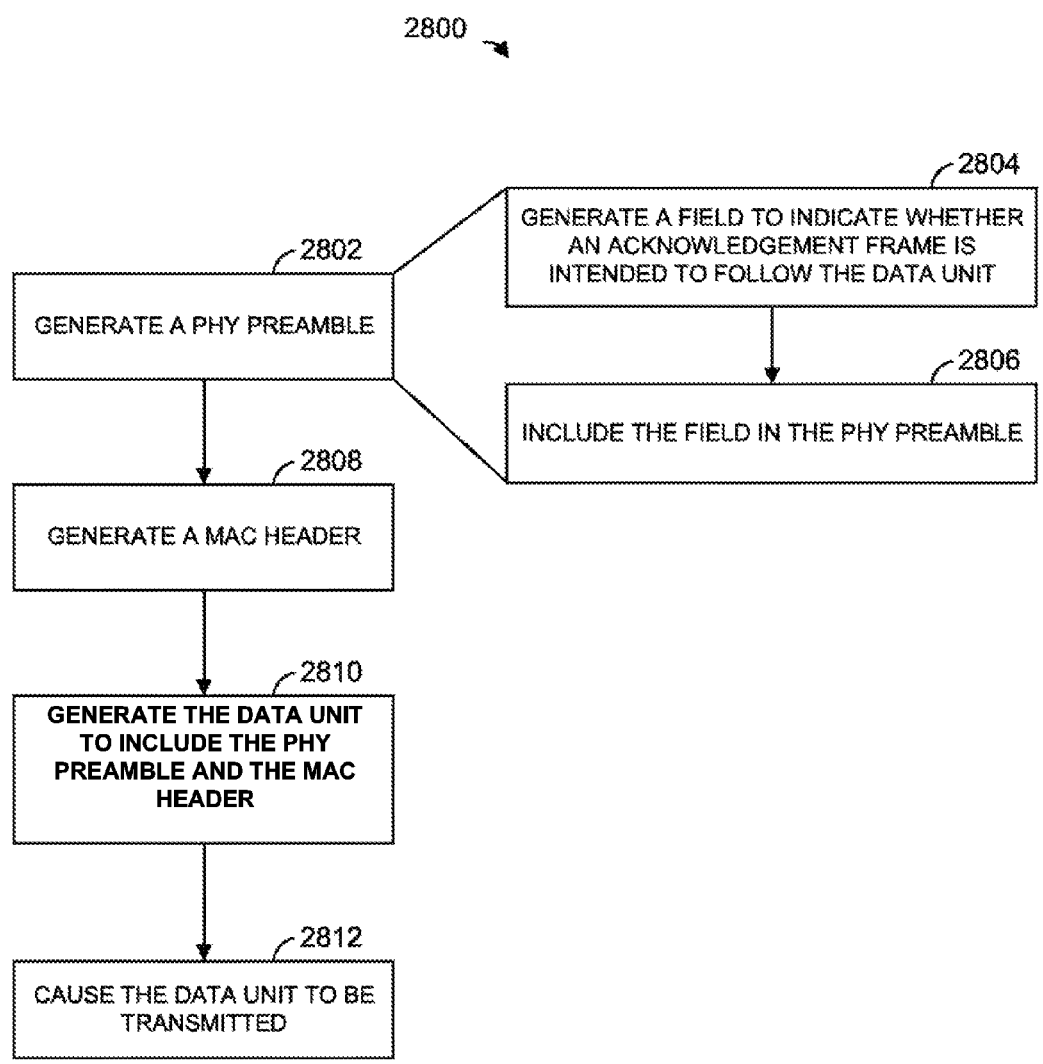
FIG. 28 is a flow diagram of an example method for generating a data unit for transmission in a wireless network, according to an embodiment.

FIG. 28 is a flow diagram of an example method 2800 for generating a data unit for transmission in a wireless network, according to an embodiment. With reference to FIG. 1, the method 2800 is implemented by the network interface 16, in an embodiment. For example, in one such embodiment, the PHY processing unit 20 is configured to implement the method 2800. According to another embodiment, the MAC processing 18 is also configured to implement at least a part of the method 2800. With continued reference to FIG. 1, in yet another embodiment, the method 2800 is implemented by the network interface 27 (e.g., the PHY processing unit 29 and/or the MAC processing unit 28). In other embodiments, the method 2800 is implemented by other suitable network interfaces.

At block 2802, a PHY preamble is generated. Generating the PHY preamble at block 2802 includes blocks 2804 and 2806. At block 2804, a field to indicate whether an acknowledgement frame is intended to follow the data unit is generated. At block 2806, the acknowledgement indication field generated at block 2804 is included in the PHY preamble generated at block 2802. In an embodiment, the acknowledgement indication is included in a signal field of the PHY preamble, such as in the signal field 2102 of the data unit 2100 of FIG. 21, for example. At block 2808, a MAC header to be included in the data unit is generated. In an embodiment the MAC header 2104 of FIG. 21 is generated. In another embodiment, another suitable MAC header is generated. At block 2810, the data unit (e.g., the data unit 2100 of FIG. 21) is generated. The data unit generated at block 2810 includes the PHY preamble generated at block 2802 and the MAC header generated at block 2808. At block 2812, the data unit generated at block 2810 is caused to be transmitted.

Figure 29:
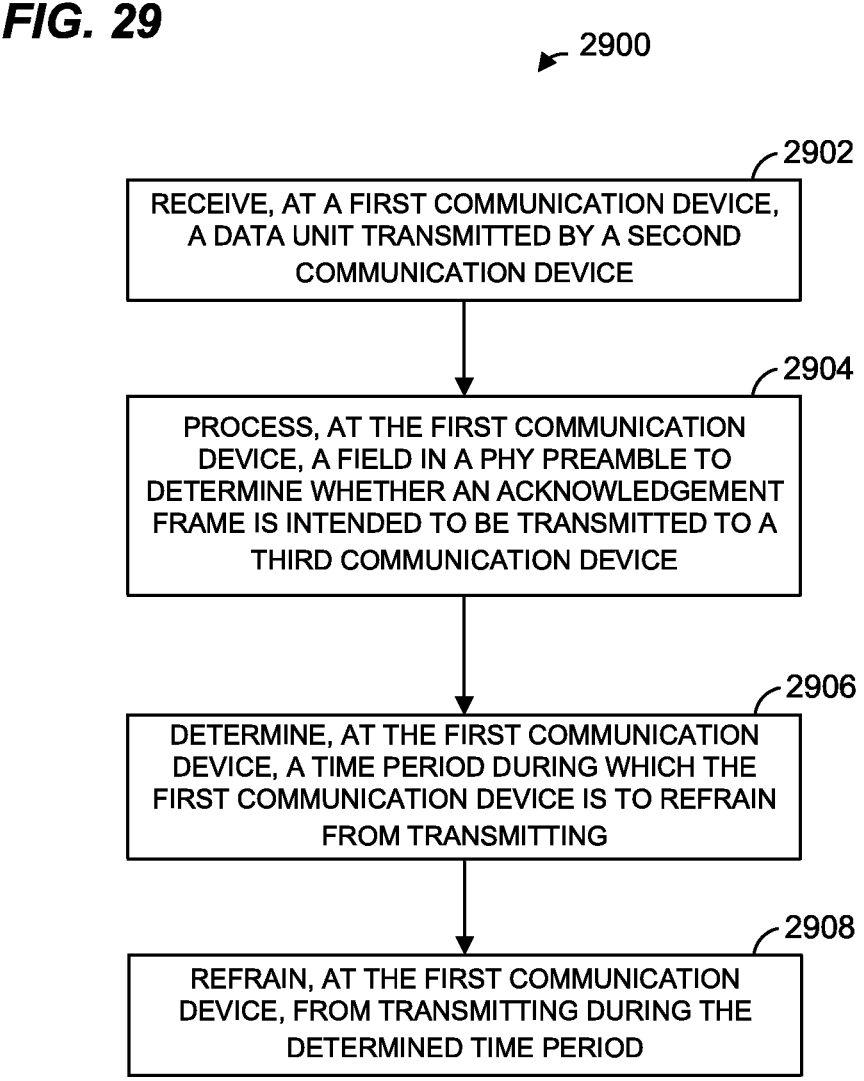
FIG. 29 is a flow diagram of an example method for sharing access to a communication medium in a wireless network, according to an embodiment.

FIG. 29 is a flow diagram of an example method 2900 for sharing access to a communication medium in a wireless network, according to an embodiment. With reference to FIG. 1, the method 2900 is implemented by the network interface 16, in an embodiment. For example, in one such embodiment, the PHY processing unit 20 is configured to implement the method 2900. According to another embodiment, the MAC processing 18 is also configured to implement at least a part of the method 2900. With continued reference to FIG. 1, in yet another embodiment, the method 2500 is implemented by the network interface 27 (e.g., the PHY processing unit 29 and/or the MAC processing unit 28). In other embodiments, the method 2500 is implemented by other suitable network interfaces.

At block 2902, a data unit is received at a first communication device (e.g., the client station 25-1). In an embodiment, the data unit 2100 of FIG. 21 is received at the first communication device. In another embodiment, another suitable data unit is received at the first communication device. The data unit includes a PHY preamble which includes an indication that indicates whether an acknowledgement frame is intended to follow the data unit, wherein the acknowledgement frame to be transmitted by a second communication device (e.g., the client station 25-2), At block 2904, the first communication device processes a field (e.g., a signal field) in the PHY preamble of the data unit received at block 2902 to determine whether an acknowledgement frame is intended to follow the data unit, wherein the acknowledgement frame is to be transmitted to a third communication device (e.g., the AP 14).

At block 2906, the first communication device determines a time period during which the first communication device is to refrain from transmitting. In an embodiment, the time period determined at block 2906 corresponds to at least to a time to transmit the data unit. Further, when it is determined at block 2904 that an acknowledgement frame is intended to follow the data unit, the time period determined at block 2906 also corresponds to a time to transmit the acknowledgement frame. In an embodiment, the first communication device sets the network allocation vector of the first communication device to the time period determined at block 2906.

At block 2908, the first communication device refrains from transmitting in the communication medium during the time period determined at block 2906. In an embodiment, refraining from transmission by the first communication device at block 2908 protects the communication medium from transmissions by the first communication device during the time period needed for the data unit to be received by the second communication device and for an acknowledgement frame to be received by the third communication device.

Figure 30:
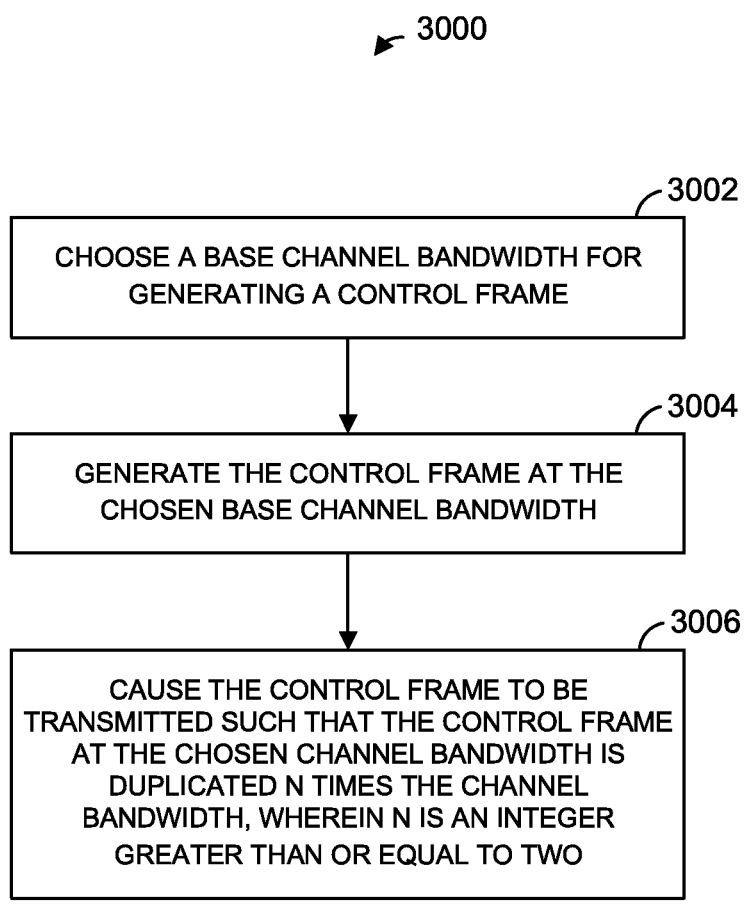
FIG. 30 is a flow diagram of an example method for transmitting a control data unit in a wireless network, according to an embodiment.

FIG. 30 is a flow diagram of an example method 3000 for transmitting a control data unit in a wireless network, according to an embodiment. With reference to FIG. 1, the method 3000 is implemented by the network interface 16, in an embodiment. For example, in one such embodiment, the PHY processing unit 20 is configured to implement the method 3000. According to another embodiment, the MAC processing 18 is also configured to implement at least a part of the method 3000. With continued reference to FIG. 1, in yet another embodiment, the method 3000 is implemented by the network interface 27 (e.g., the PHY processing unit 29 and/or the MAC processing unit 28). In other embodiments, the method 3000 is implemented by other suitable network interfaces.

At block 3002, a base channel bandwidth for generating the control data unit is chosen at a communication device (e.g., the AP 14 or the client station 25-1). Then, at block 3004, the control data unit is generated at the base bandwidth chosen at block 3002. At block 3006, the control data unit generated at block 3004 is caused to be transmitted such that the control data unit generated at the case bandwidth channel is duplicated to generate a transmission occupying a bandwidth N times the base channel bandwidth, wherein N is an integer greater than or equal to two. Because the control data unit is duplicated, a device operating in a bandwidth different than the bandwidth determined at block 2902 is able to receive and interpret the control data unit, in an embodiment. In an embodiment, such duplicated transmission of control data units ensures, for example, that transmission meant to be protected by the control data unit (RTS control data unit, CTS control data unit, etc.) are protected from transmissions by devices operating in a bandwidth different from the base bandwidth chosen at block 3002.

Figure 31:
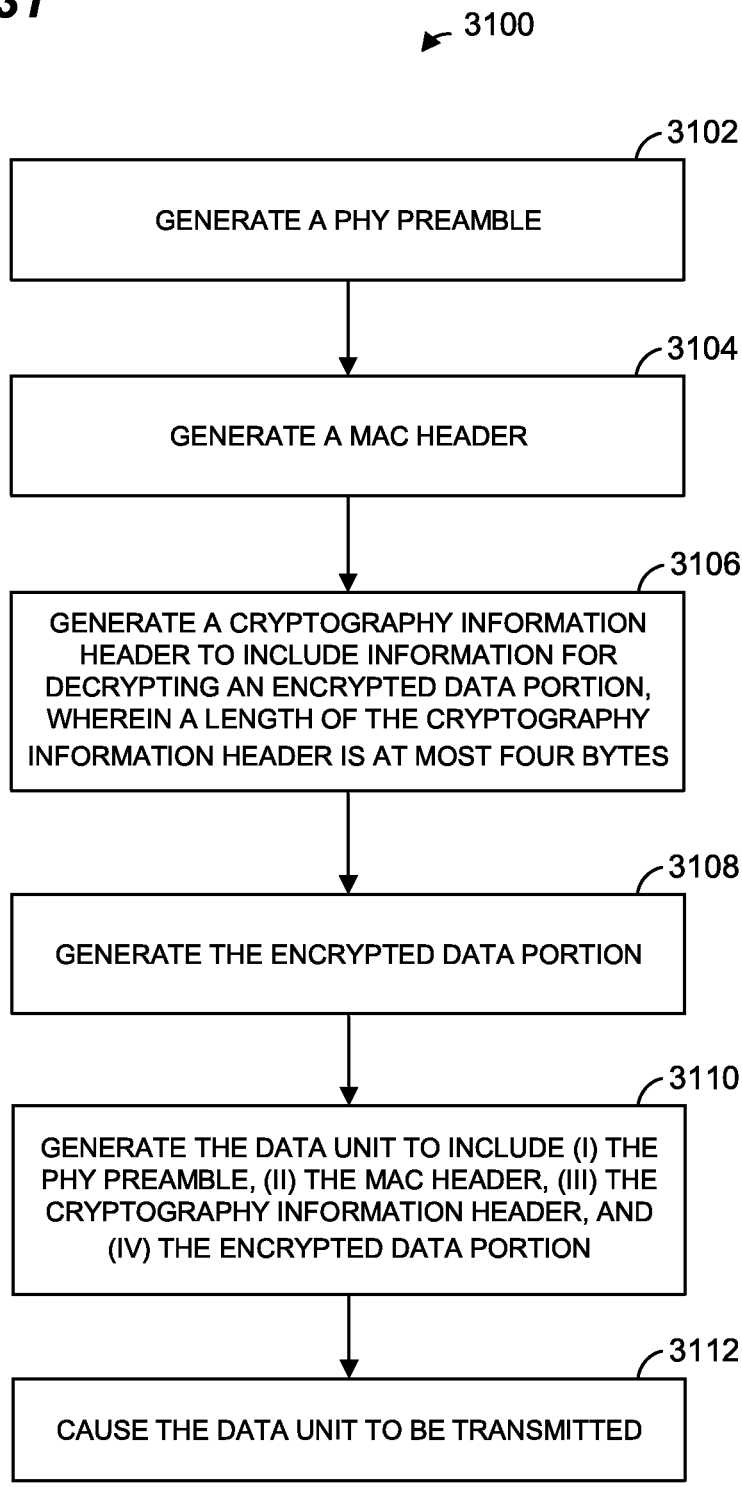
FIG. 31 is a flow diagram of an example method for transmitting a data unit in a wireless network, according to an embodiment.

FIG. 31 is a flow diagram of an example method 3100 for transmitting a data unit in a wireless network, according to an embodiment. With reference to FIG. 1, the method 3100 is implemented by the network interface 16, in an embodiment. For example, in one such embodiment, the PHY processing unit 20 is configured to implement the method 3100. According to another embodiment, the MAC processing 18 is also configured to implement at least a part of the method 3100. With continued reference to FIG. 1, in yet another embodiment, the method 3100 is implemented by the network interface 27 (e.g., the PHY processing unit 29 and/or the MAC processing unit 28). In other embodiments, the method 3100 is implemented by other suitable network interfaces.

At block 2103, a PHY preamble of the data unit is generated. At block 3104, a MAC header of the data unit is generated. At block 3106, a cryptography information header is generated. The cryptography information header includes information for decrypting an encrypted data portion of the data unit. In an embodiment, a length of the cryptography information header is at most four bytes. At block 3110, the data unit is generated. The data unit generated at block 3110 includes the PHY preamble generated at block 3102, the MAC header generated at block 3104 and the encryption information header generated at block 3108. The data unit generated at block 3110 also includes an encrypted data portion. At block 3112, the data unit generated at block 3110 is caused to be transmitted. In an embodiment, a receiving device that receives the data unit transmitted at block 3112 is able to decrypt the encrypted data portion of the data unit based on information included in the short (e.g., 4 byte) encryption information header generated at block 3104.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating a data unit for transmission in a wireless network, the method comprising:
    generating a physical layer (PHY) preamble, including:
        generating a field to indicate whether an acknowledgment data unit is intended to follow the data unit,
        including the field in the PHY preamble;
    generating a media access control layer (MAC) header;
    generating the data unit to include the PHY preamble and the MAC header; and
    causing the data unit to be transmitted.

2. A method according to claim 1, wherein the field also indicates, when the acknowledgment data unit is intended to follow the data unit, whether the acknowledgment data unit is a block acknowledgment.

3. A method according to claim 1, wherein:
    the field consists of two bits;
    a first value of the field indicates the acknowledgment data unit is intended to follow the data unit;
    a second value of the field indicates a block acknowledgment data unit is intended to follow the data unit; and
    a third value of the field indicates that no acknowledgment data unit is intended to follow the data unit.

4. A method according to claim 1, wherein:
    the data unit is a first data unit;
    the field to indicate whether an acknowledgment data unit is intended to follow the first data unit is a first field;
    the method further comprises:
    generating a second field to indicate whether a second data unit is to be transmitted after the acknowledgment data unit;
    including the second field in the PHY preamble of the first data unit;

generating the second data unit; and
causing the second data unit to be transmitted after receiving the acknowledgement data unit.

5. An apparatus, comprising:
a network interface configured to
generate a physical layer (PHY) preamble at least by
generating a field to indicate whether an acknowledgment data unit is intended to follow the data unit, and
including the field in the PHY preamble;
generate a media access control layer (MAC) header;
generate the data unit to include the PHY preamble and the MAC header; and
transmit the data unit.

6. An apparatus according to claim 5, wherein the field also indicates, when the acknowledgment data unit is intended to follow the data unit, whether the acknowledgment data unit is a block acknowledgment.

7. An apparatus according to claim 5, wherein:
the field consists of two bits;
a first value of the field indicates the acknowledgment data unit is intended to follow the data unit;
a second value of the field indicates a block acknowledgment data unit is intended to follow the data unit; and
a third value of the field indicates that no acknowledgment data unit is intended to follow the data unit.

8. An apparatus according to claim 5, wherein:
the data unit is a first data unit;
the field to indicate whether an acknowledgment frame is intended to follow the first data unit is a first field;
the network interface is further configured to:
generate a second field to indicate whether a second data unit is to be transmitted after the acknowledgment frame,
include the second field in the PHY preamble of the first data unit, generate the second data unit, and
transmit the second data unit after receiving the acknowledgement frame.

9. A method for sharing access to a communication medium in a wireless network, the method comprising:
receiving, at a first communication device, a data unit transmitted by a second communication device;
processing, at the first communication device, a field in a physical layer (PHY) preamble of the data unit to determine whether an acknowledgement data unit is intended to follow the data unit, wherein the field in the PHY preamble indicates whether an acknowledgement data unit is intended to follow the data unit, and wherein the acknowledgment data unit is to be transmitted by a third communication device;
determining, at the first communication device, a time period during which the first communication device is to refrain from transmitting, wherein the time period corresponds to (i) a time to transmit the data unit and, (ii) when it is determined that an acknowledgement data unit is intended to follow the data unit, a time to transmit the acknowledgment data unit; and
refraining, at the first communication device, from transmitting during the determined time period.

10. A method according to claim 9, wherein the field also indicates, when the acknowledgment data unit is intended to follow the data unit, whether the acknowledgment data unit is a block acknowledgment.

11. A method according to claim 9, wherein:
the field consists of two bits;
a first value of the field indicates the acknowledgment data unit is intended to follow the data unit;
a second value of the field indicates a block acknowledgment data unit is intended to follow the data unit; and
a third value of the field indicates that no acknowledgment data unit is intended to follow the data unit.

12. A method according to claim 9, wherein:
the data unit is a first data unit;
the field to indicate whether an acknowledgment data unit is intended to follow the first data unit is a first field;
the method further comprises processing, at the first communication device, a second field in the PHY preamble of the first data unit to determine whether a second data unit is to be transmitted by the second communication device after the acknowledgement data unit;
wherein the time period also corresponds to, (iii) when it is determined that the second data unit is to be transmitted by the second communication device after the acknowledgement data unit, a time to transmit the second data unit.

13. A method according to claim 9, wherein:
the data unit is a first data unit;
the field to indicate whether an acknowledgment data unit is intended to follow the first data unit is a first field;
the method further comprises:
receiving, at the first communication device, the acknowledgment data unit transmitted by the third communication device, and
processing, at the first communication device, a second field in the acknowledgment data unit to determine whether a second data unit is to be transmitted by the second communication device after the acknowledgement data unit, wherein the second field in the acknowledgment data unit indicates whether the second data unit is to be transmitted by the second communication device after the acknowledgement data unit; and
wherein the time period also corresponds to, (iii) when it is determined that the second data unit is to be transmitted by the second communication device after the acknowledgement data unit, a time to transmit the second data unit.

14. A first communication device, comprising:
a network interface configured to:
receive a data unit transmitted by a second communication device;
process a field in a physical layer (PHY) preamble of the data unit to determine whether an acknowledgement data unit is intended to follow the data unit, wherein the field in the PHY preamble indicates whether an acknowledgement data unit is intended to follow the data unit, and wherein the acknowledgment data unit is to be transmitted by a third communication device;
determine a time period during which the first device is to refrain from transmitting, wherein the time period corresponds to (i) a time to transmit the data unit and, (ii) when it is determined that an acknowledgement data unit is intended to follow the data unit, a time to transmit the acknowledgment data unit; and
refrain from transmitting during the determined time period.

15. A first communication device according to claim 14, wherein the field also indicates, when the acknowledgment data unit is intended to follow the data unit, whether the acknowledgment data unit is a block acknowledgment.

16. A first communication device according to claim 14, wherein:
the field consists of two bits;
a first value of the field indicates the acknowledgment data unit is intended to follow the data unit;

a second value of the field indicates a block acknowledgment data unit is intended to follow the data unit; and
a third value of the field indicates that no acknowledgment data unit is intended to follow the data unit.

17. A first communication device according to claim 14, wherein:
the data unit is a first data unit;
the field to indicate whether an acknowledgment data unit is intended to follow the first data unit is a first field;
the network interface is configured to process a second field in the PHY preamble of the first data unit to determine whether a second data unit is to be transmitted by the second communication device after the acknowledgement data unit;
wherein the time period also corresponds to, (iii) when it is determined that the second data unit is to be transmitted by the second communication device after the acknowledgement data unit, a time to transmit the second data unit.

18. A first communication device according to claim 14, wherein:
the data unit is a first data unit;
the field to indicate whether an acknowledgment data unit is intended to follow the first data unit is a first field;
the network interface is configured to:
    receive the acknowledgment data unit transmitted by the third communication device, and
    process a second field in the acknowledgment data unit to determine whether a second data unit is to be transmitted by the second communication device after the acknowledgement data unit, wherein the second field in the acknowledgment data unit indicates whether the second data unit is to be transmitted by the second communication device after the acknowledgement data unit; and
wherein the time period also corresponds to, (iii) when it is determined that the second data unit is to be transmitted by the second communication device after the acknowledgement data unit, a time to transmit the second data unit.

* * * * *